United States Patent
Chai

(10) Patent No.: US 12,388,933 B2
(45) Date of Patent: Aug. 12, 2025

(54) METHOD AND APPARATUS FOR INFORMATION EXCHANGE IN ONLINE CHARGING

(71) Applicant: Huawei Technologies Co., Ltd., Shenzhen (CN)

(72) Inventor: Xiaoqian Chai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 242 days.

(21) Appl. No.: 17/887,688

(22) Filed: Aug. 15, 2022

(65) Prior Publication Data

US 2022/0394134 A1    Dec. 8, 2022

Related U.S. Application Data

(63) Continuation of application No. 15/599,032, filed on May 18, 2017, now Pat. No. 11,438,462, which is a
(Continued)

(30) Foreign Application Priority Data

Nov. 18, 2014    (CN) .......................... 201410660401.X

(51) Int. Cl.
*H04M 15/00*    (2024.01)
*G06Q 30/04*    (2012.01)
(Continued)

(52) U.S. Cl.
CPC ............ *H04M 15/64* (2013.01); *G06Q 30/04* (2013.01); *H04L 12/1403* (2013.01);
(Continued)

(58) Field of Classification Search
CPC ...... H04M 15/64; H04M 15/39; H04M 15/62; H04M 15/66; H04M 15/785;
(Continued)

(56) References Cited

U.S. PATENT DOCUMENTS

| 9,026,100 B2 | 5/2015 | Castro Castro et al. |
| 2006/0114932 A1 | 6/2006 | Cai et al. |

(Continued)

FOREIGN PATENT DOCUMENTS

| CN | 101257394 A | 9/2008 |
| CN | 101364882 A | 2/2009 |

(Continued)

OTHER PUBLICATIONS

Bart, B., "Online Charging System (OCS)—introduction to Gy interface, LTE and Beyond," http://www.lteandbeyond.com/2012/01/online-charging-systems-ocs-how-gy.html, Jan. 11, 2012, 12 pages.

(Continued)

*Primary Examiner* — Kenneth T Lam
(74) *Attorney, Agent, or Firm* — Conley Rose, P.C.

(57) ABSTRACT

A method and an apparatus for information exchange in online charging in order to reduce frequency of information exchange between a Charging Trigger Function (CTF) device and an Online Charging System (OCS), and reduce a pressure of information transmission between the CTF device and the OCS, where the method includes receiving, by a CTF device, a credit control answer (CCA) message that carries a non-real-time Trigger and sent by an OCS, recording, by the CTF device, charging information before and after a corresponding event of the non-real-time Trigger happens each time before sending a credit control request (CCR) message to the OCS next time, and sending, by the CTF device, the CCR message to the OCS.

26 Claims, 13 Drawing Sheets

Related U.S. Application Data continuation of application No. PCT/CN2015/086941, filed on Aug. 14, 2015.

(51) Int. Cl.

| | |
|---|---|
| *H04L 12/14* | (2006.01) |
| *H04M 17/00* | (2006.01) |
| *H04M 17/02* | (2006.01) |
| *H04W 4/24* | (2018.01) |

(52) U.S. Cl.
CPC ........ *H04L 12/1407* (2013.01); *H04L 12/141* (2013.01); *H04L 12/1464* (2013.01); *H04M 15/39* (2013.01); *H04M 15/62* (2013.01); *H04M 15/66* (2013.01); *H04M 15/785* (2013.01); *H04M 15/8016* (2013.01); *H04M 17/02* (2013.01); *H04M 17/204* (2013.01); *H04W 4/24* (2013.01); *H04M 15/8228* (2013.01)

(58) Field of Classification Search
CPC ............. H04M 15/8016; H04M 17/02; H04M 17/204; H04M 15/8228; G06Q 30/04; H04L 12/1403; H04L 12/1407; H04L 12/141; H04L 12/1464; H04L 12/14; H04W 4/24

See application file for complete search history.

(56) References Cited

U.S. PATENT DOCUMENTS

| | | |
|---|---|---|
| 2007/0165803 A1 | 7/2007 | Duan |
| 2007/0185809 A1 | 8/2007 | Duan |
| 2007/0297583 A1 | 12/2007 | Shan |
| 2008/0153457 A1 | 6/2008 | Stura et al. |
| 2008/0243655 A1 | 10/2008 | Cai et al. |
| 2009/0024502 A1 | 1/2009 | Xie et al. |
| 2011/0098066 A1 | 4/2011 | Goermer et al. |
| 2012/0033560 A1 | 2/2012 | Duan |
| 2012/0099715 A1 | 4/2012 | Ravishankar et al. |
| 2012/0129490 A1 | 5/2012 | Sharma et al. |
| 2012/0170517 A1* | 7/2012 | Zhou ............... H04M 15/66 370/328 |
| 2012/0233323 A1* | 9/2012 | Conte ............... H04L 12/1425 709/224 |
| 2012/0243432 A1 | 9/2012 | Liebsch et al. |
| 2012/0259747 A1 | 10/2012 | Bystrom et al. |
| 2014/0051384 A1* | 2/2014 | Mao ............... H04M 15/85 455/406 |
| 2014/0337229 A1 | 11/2014 | Gustafsson |
| 2015/0156334 A1 | 6/2015 | Chai |
| 2015/0271344 A1* | 9/2015 | Bertze ............... H04W 4/24 455/408 |
| 2016/0174145 A1* | 6/2016 | Zee ............... H04W 48/16 370/328 |
| 2016/0301809 A1* | 10/2016 | Yang ............... H04M 15/8351 |
| 2017/0264751 A1* | 9/2017 | Chai ............... G06Q 30/04 |

FOREIGN PATENT DOCUMENTS

| | | |
|---|---|---|
| CN | 101378323 A | 3/2009 |
| CN | 102487323 A | 6/2012 |
| CN | 104468135 A | 3/2015 |
| EP | 2466866 A1 | 6/2012 |
| JP | 2007529925 A | 10/2007 |
| JP | 2008509581 A | 3/2008 |
| JP | 2010524296 A | 7/2010 |
| JP | 2010213302 A | 9/2010 |
| JP | 2011527528 A | 10/2011 |
| JP | 2013511865 A | 4/2013 |
| JP | 2013516134 A | 5/2013 |
| JP | 2014195318 A | 10/2014 |
| WO | 2012109881 A1 | 8/2012 |
| WO | 2014022992 A1 | 2/2014 |
| WO | 2014052044 A1 | 4/2014 |
| WO | 2014166450 A1 | 10/2014 |

OTHER PUBLICATIONS

Cheboldaeff, M., et al., "Interaction between an Online Charging System and a Policy Server," ICN 2011: The Tenth International Conference on Networks, 2011, pp. 47-51.

Gioia, S., et al., "Understanding the IMS Charging Architecture," Oracle, technical Article, Jul. 25, 2007, 13 pages.

"3rd Generation Partnership Project; Technical Specification Group Services and System Aspects; Telecommunication Management; Charging management; Diameter charging applications (Release 12)," 3GPP TS 32.299, V12.5.1, Technical Specification, Jul. 2014, 161 pages.

"3rd Generation Partnership Project; Technical Specification Group Services and Systems Aspects; Telecommunication management; Charging management; Diameter charging applications (Release 12)," 3GPP TS 32.299, V12.6.0, Technical Specification, Sep. 2014, 164 pages.

Qi, Z., et al., "Optimization of Granted-Unit Push Procedure for Online Charging System in 3GPP," China Academic Journal Electronic Publishing House, No. 2, 2010, pp. 20-23.

* cited by examiner

METHOD AND APPARATUS FOR INFORMATION EXCHANGE IN ONLINE CHARGING

CROSS-REFERENCE TO RELATED APPLICATIONS

This is a continuation of U.S. patent application Ser. No. 15/599,032, filed on May 18, 2017, which is a continuation of Int'l Patent App. No. PCT/CN2015/086941, filed on Aug. 14, 2015, which claims priority to Chinese Patent App. No. 201410660401.X, filed on Nov. 18, 2014, all of which are incorporated by reference.

TECHNICAL FIELD

The present disclosure relates to the field of electronic information technologies, and in particular, to a method and an apparatus for information exchange in online charging.

BACKGROUND

As an increasing quantity of online services are used, an operator needs to monitor, in real time, a status of using an online service by a user, and settle, in real time, a tariff for the online service used by the user. Currently, an Online Charging System (OCS) is often used for online charging.

To ensure accuracy of online charging performed using the OCS, a network device that bears a Charging Trigger Function (CTF) needs to report charging information to the OCS in real time. For example, after receiving a credit control request (CCR) message sent by the network device that bears the CTF, the OCS sends, to the network device that bears the CTF, a credit control answer (CCA) message carrying a trigger condition (Trigger). The network device that bears the CTF monitors, in real time, whether a charging event corresponding to the Trigger happens, and when the charging event happens, the network device that bears the CTF reports charging information or re-authorization request information to the OCS using a dynamic Trigger mechanism such that the OCS can obtain, in real time, the charging information when the charging event happens.

However, in an actual application, Quality of Service (QOS) of a user terminal often changes, a location of a user terminal is often updated, and so on, and consequently charging events happen frequently within a short time. Therefore, the network device that bears the CTF needs to frequently report charging information to the OCS, increasing frequency of information exchange between the network device that bears the CTF and the OCS, and increasing a pressure of information transmission between the network device that bears the CTF and the OCS.

SUMMARY

Embodiments of the present disclosure provide a method and an apparatus for information exchange in online charging in order to reduce frequency of information exchange between a CTF device and an OCS, and reduce a pressure of information transmission between the CTF device and the OCS.

To achieve the foregoing objectives, the following technical solutions are used in the embodiments of the present disclosure.

According to a first aspect, an embodiment of the present disclosure provides a method for information exchange in online charging, where the method includes: receiving, by a CTF device, a CCA message that carries a non-real-time Trigger sent by an OCS, where the CCA message responds to a CCR message that carries a quota request sent by the CTF device, where the non-real-time Trigger corresponds to one or more quotas of a rating group, and where the non-real-time Trigger refers to when a corresponding event happens, the CTF device is triggered to record charging information before and after the corresponding event happens, and the CTF device is not triggered to report the recorded charging information to the OCS; recording, before sending a CCR message to the OCS next time, by the CTF device, charging information before and after the corresponding event of the non-real-time Trigger happens each time; and sending, by the CTF device, the CCR message to the OCS, where the CCR message includes the charging information before and after the corresponding event of the non-real-time Trigger happens each time.

With reference to the first aspect, in a first possible implementation manner of the first aspect, recording charging information before and after the corresponding event of the non-real-time Trigger happens each time includes storing, each time when detecting that the corresponding event of the non-real-time Trigger happens, by the CTF device, quota usage information of the rating group corresponding to the non-real-time Trigger and/or information about the corresponding event of the non-real-time Trigger before the non-real-time Trigger happens, and restarting to record quota usage information and/or information about the corresponding event of the non-real-time Trigger after the non-real-time Trigger happens.

With reference to the first aspect, or the first possible implementation manner of the first aspect, in a second possible implementation manner of the first aspect, before sending, by the CTF device, the CCR message to the OCS, the method further includes separately placing the charging information before and after the corresponding event of the non-real-time Trigger happens each time into different containers, where the CCR message includes at least two containers, and where the charging information includes one or more of the quota usage information recorded by the CTF device, the non-real-time Trigger, or the information about the corresponding event of the non-real-time Trigger. The non-real-time Trigger includes one or more of the following a user location changes, an allocated QoS value changes, an accessed wireless network type changes, a serving gateway address changes, a serving gateway type changes, a time zone in which a user is located changes, or a serving network public land mobile network (PLMN) changes, and the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

With reference to the second possible implementation manner of the first aspect, in a third possible implementation manner of the first aspect, before sending, by the CTF device, the CCR message to the OCS, and when at least two corresponding events of the non-real-time Trigger happen simultaneously, the method further includes placing charging information before the simultaneous events happen into a same container.

With reference to the second possible implementation manner of the first aspect, in a fourth possible implementation manner of the first aspect, information in the container includes the quota usage information of the rating group corresponding to the non-real-time Trigger and/or information about all corresponding events of the non-real-time Trigger before the non-real-time Trigger happens.

With reference to the second possible implementation manner of the first aspect, in a fifth possible implementation manner of the first aspect, before the sending, by the CTF device, the CCR message to the OCS, the method further includes determining, by the CTF device, whether same information exists in the charging information in the different containers, and placing, outside the containers, the same information in the charging information in the different containers if the same information exists.

With reference to the second possible implementation manner of the first aspect, in a sixth possible implementation manner of the first aspect, information in the container includes the quota usage information of the rating group corresponding to the non-real-time Trigger before the corresponding event of the non-real-time Trigger happens and information about all corresponding events that have happened in a current reporting period and of the non-real-time Trigger sent by the OCS.

With reference to the second possible implementation manner of the first aspect, in a seventh possible implementation manner of the first aspect, information in the container includes the quota usage information of the rating group corresponding to the non-real-time Trigger before the corresponding event of the non-real-time Trigger happens and information about all corresponding events of the non-real-time Trigger sent by the OCS.

With reference to any one of the second to the seventh possible implementation manners of the first aspect, in an eighth possible implementation manner of the first aspect, the container further includes the non-real-time Trigger if the information in the container is information before the corresponding event of the non-real-time Trigger happens, or the container does not include any non-real-time Trigger if the information in the container is information after the corresponding event of the non-real-time Trigger happens for the last time and before the CTF device sends the CCR message to the OCS.

With reference to any one of the second to the eighth possible implementation manners of the first aspect, in a ninth possible implementation manner of the first aspect, the containers included in the CCR message separately carry one sequence number, and sequence numbers of the containers are arranged in time sequence such that the OCS differentiates the containers in time sequence according to the sequence numbers of the containers.

With reference to any one of the first aspect or the first to the ninth possible implementation manners of the first aspect, in a tenth possible implementation manner of the first aspect, the CTF device sends the CCR message to the OCS when the event happens if corresponding events of a real-time Trigger and the non-real-time Trigger carried in the CCA message sent by the OCS are the same.

With reference to any one of the first aspect or the first to the tenth possible implementation manners of the first aspect, in an eleventh possible implementation manner of the first aspect, the CTF device has received the non-real-time Trigger sent by the OCS, and the method further includes replacing, by the CTF device, the received non-real-time Trigger with the new non-real-time Trigger when the CTF device receives again a CCA message that carries a new non-real-time Trigger and that is sent by the OCS.

With reference to any one of the first aspect or the first to the eleventh possible implementation manners of the first aspect, in a twelfth possible implementation manner of the first aspect, the method further includes receiving, by the CTF device, a CCA message that carries a null non-real-time Trigger sent by the OCS, where the null non-real-time Trigger does not correspond to any event, and invalidating, by the CTF device, a currently used non-real-time Trigger.

According to a second aspect, an embodiment of the present disclosure provides a method for information exchange in online charging, where the method includes receiving, by an OCS, a CCR message sent by a CTF device and that carries a quota request, determining, by the OCS, a non-real-time Trigger according to the quota request, and sending a CCA message carrying the non-real-time Trigger to the CTF device, where the non-real-time Trigger corresponds to one or more quotas of a rating group, and the non-real-time Trigger refers to when a corresponding event happens, the CTF device is triggered to record charging information before and after the corresponding event happens, and the CTF device is not triggered to report the recorded charging information to the OCS, and receiving, by the OCS, a CCR message sent by the CTF device and that carries charging information, where the CCR message carrying the charging information includes charging information before and after the corresponding event of the non-real-time Trigger happens each time.

With reference to the second aspect, in a first possible implementation manner of the second aspect, the CCR message carrying the charging information includes at least two containers, and the charging information before and after the corresponding event of the non-real-time Trigger happens each time is separately placed into different containers. The charging information includes one or more of quota usage information recorded by the CTF device, the non-real-time Trigger, or information about the corresponding event of the non-real-time Trigger. The non-real-time Trigger includes one or more of a user location changes, an allocated QoS value changes, an accessed wireless network type changes, a serving gateway address changes, a serving gateway type changes, a time zone in which a user is located changes, or a serving network PLMN changes. The information about the corresponding event of the non-real-time Trigger includes at least one or more values of the user location, the allocated QOS value, the accessed wireless network type, the serving gateway address, the serving gateway type, the time zone in which the user is located, or the serving network PLMN.

With reference to the first possible implementation manner of the second aspect, in a second possible implementation manner of the second aspect, information in the container includes quota usage information of the rating group corresponding to the non-real-time Trigger and/or information about all corresponding events of the non-real-time Trigger before the non-real-time Trigger happens.

With reference to the first possible implementation manner of the second aspect, in a third possible implementation manner of the second aspect, information in the container includes quota usage information of the rating group corresponding to the non-real-time Trigger before the corresponding event of the non-real-time Trigger happens and information about all corresponding events that have happened in a current reporting period and of the non-real-time Trigger sent by the OCS.

With reference to the first possible implementation manner of the second aspect, in a fourth possible implementation manner of the second aspect, information in the container includes quota usage information of the rating group corresponding to the non-real-time Trigger before the corresponding event of the non-real-time Trigger happens and information about all corresponding events of the non-real-time Trigger sent by the OCS.

With reference to any one of the second to the fourth possible implementation manners of the second aspect, in a fifth possible implementation manner of the second aspect, the information in the container is information before the corresponding event of the non-real-time Trigger happens if the container further includes the non-real-time Trigger, or the information in the container is information after the corresponding event of the non-real-time Trigger happens for the last time and before the CTF device sends the CCR message to the OCS if the container does not include any non-real-time Trigger.

With reference to any one of the first to the fifth possible implementation manners of the second aspect, in a sixth possible implementation manner of the second aspect, the containers included in the CCR message separately carry one sequence number, sequence numbers of the containers are arranged in time sequence, and the OCS differentiates the containers in time sequence according to the sequence numbers of the containers.

According to a third aspect, an embodiment of the present disclosure provides an apparatus for information exchange in online charging, where the apparatus includes a receiving module configured to receive a CCA message that carries a non-real-time Trigger sent by an OCS, where the CCA message responds to a CCR message that carries a quota request sent by the CTF device, the non-real-time Trigger corresponds to one or more quotas of a rating group, and the non-real-time Trigger refers to when a corresponding event happens, the CTF device is triggered to record charging information before and after the corresponding event happens, and the CTF device is not triggered to report the recorded charging information to the OCS, a storage module configured to record, before a CCR message is sent to the OCS next time, charging information before and after the corresponding event of the non-real-time Trigger happens each time, and a sending module configured to send the CCR message to the OCS, where the CCR message includes the charging information before and after the corresponding event of the non-real-time Trigger happens each time.

With reference to the third aspect, in a first possible implementation manner of the third aspect, the storage module is further configured to separately place the charging information before and after the corresponding event of the non-real-time Trigger happens each time into different containers before the CTF device sends the CCR message to the OCS, where the CCR message includes at least two containers, and the charging information includes one or more of quota usage information recorded by the CTF device, the non-real-time Trigger, or information about the corresponding event of the non-real-time Trigger. The non-real-time Trigger includes one or more of the following a user location changes, an allocated QOS value changes, an accessed wireless network type changes, a serving gateway address changes, a serving gateway type changes, a time zone in which a user is located changes, or a serving network PLMN changes. The information about the corresponding event of the non-real-time Trigger includes at least one or more values of the user location, the allocated QoS value, the accessed wireless network type, the serving gateway address, the serving gateway type, the time zone in which the user is located, or the serving network PLMN.

With reference to the first possible implementation manner of the third aspect, in a second possible implementation manner of the third aspect, when at least two corresponding events of the non-real-time Trigger happen simultaneously, the storage module is further configured to place charging information before the simultaneous events happen into a same container.

With reference to the first possible implementation manner of the third aspect, in a third possible implementation manner of the third aspect, information in the container includes quota usage information of the rating group corresponding to the non-real-time Trigger and/or information about all corresponding events of the non-real-time Trigger before the non-real-time Trigger happens, or information in the container includes quota usage information of the rating group corresponding to the non-real-time Trigger before the corresponding event of the non-real-time Trigger happens and information about all corresponding events that have happened in a current reporting period and that are of the non-real-time Trigger sent by the OCS, or information in the container includes quota usage information of the rating group corresponding to the non-real-time Trigger before the corresponding event of the non-real-time Trigger happens and information about all corresponding events of the non-real-time Trigger sent by the OCS, and the apparatus further includes a processing module configured to determine whether same information exists in the charging information in the different containers before the CTF device sends the CCR message to the OCS, and place, outside the containers, the same information in the charging information in the different containers if the same information exists.

With reference to any one of the third aspect or the first to the third possible implementation manners of the third aspect, in a fourth possible implementation manner of the third aspect, the container further includes the non-real-time Trigger if the information in the container is information before the corresponding event of the non-real-time Trigger happens, or the container does not include any non-real-time Trigger if the information in the container is information after the corresponding event of the non-real-time Trigger happens for the last time and before the CTF device sends the CCR message to the OCS.

With reference to any one of the third aspect or the first to the fourth possible implementation manners of the third aspect, in a fifth possible implementation manner of the third aspect, the containers included in the CCR message separately carry one sequence number, and sequence numbers of the containers are arranged in time sequence such that the OCS differentiates the containers in time sequence according to the sequence numbers of the containers.

With reference to any one of the third aspect or the first to the fifth possible implementation manners of the third aspect, in a sixth possible implementation manner of the third aspect, the receiving module is further configured to receive again a CCA that carries a new non-real-time Trigger sent by the OCS, where the CTF device has received the non-real-time Trigger sent by the OCS, and the processing module is further configured to replace the received non-real-time Trigger with the new non-real-time Trigger.

With reference to any one of the third aspect or the first to the sixth possible implementation manners of the third aspect, in a seventh possible implementation manner of the third aspect, the receiving module is further configured to receive a CCA message that carries a null non-real-time Trigger sent by the OCS, where the null non-real-time Trigger does not correspond to any event, and the processing module is further configured to invalidate a currently used non-real-time Trigger.

According to a fourth aspect, an embodiment of the present disclosure provides an apparatus for information exchange in online charging, where the apparatus includes a receiving module configured to receive a CCR message sent by a CTF device and that carries a quota request, a processing module configured to determine a non-real-time Trigger according to the quota request, and a sending module configured to send a CCA message carrying the non-real-time Trigger to the CTF device, where the non-real-time Trigger corresponds to one or more quotas of a rating group, and the non-real-time Trigger refers to when a corresponding event happens, the CTF device is triggered to record charging information before and after the corresponding event happens, and the CTF device is not triggered to report the recorded charging information to an OCS, where the receiving module is further configured to receive a CCR message sent by the CTF device and that carries charging information, where the CCR message includes charging information before and after the corresponding event of the non-real-time Trigger happens each time.

With reference to the fourth aspect, in a first possible implementation manner of the fourth aspect, the CCR message carrying the charging information includes at least two containers, and the charging information before and after the corresponding event of the non-real-time Trigger happens each time is separately placed into different containers, and the charging information includes one or more of quota usage information recorded by the CTF device, the non-real-time Trigger, or information about the corresponding event of the non-real-time Trigger. The non-real-time Trigger includes one or more of the following a user location changes, an allocated QOS value changes, an accessed wireless network type changes, a serving gateway address changes, a serving gateway type changes, a time zone in which a user is located changes, or a serving network PLMN changes, and the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

With reference to the first possible implementation manner of the fourth aspect, in a second possible implementation manner of the fourth aspect, information in the container includes quota usage information of the rating group corresponding to the non-real-time Trigger and/or information about all corresponding events of the non-real-time Trigger before the non-real-time Trigger happens, or information in the container includes quota usage information of the rating group corresponding to the non-real-time Trigger before the corresponding event of the non-real-time Trigger happens and information about all corresponding events that have happened in a current reporting period and that are of the non-real-time Trigger sent by the OCS, or information in the container includes quota usage information of the rating group corresponding to the non-real-time Trigger before the corresponding event of the non-real-time Trigger happens and information about all corresponding events of the non-real-time Trigger sent by the OCS.

With reference to any one of the fourth aspect or the first and the second possible implementation manners of the fourth aspect, in a third possible implementation manner of the fourth aspect, the information in the container is information before the corresponding event of the non-real-time Trigger happens if the container further includes the non-real-time Trigger, or the information in the container is information after the corresponding event of the non-real-time Trigger happens for the last time and before the CTF device sends the CCR message to the OCS if the container does not include any non-real-time Trigger.

With reference to any one of the first to the third possible implementation manners of the fourth aspect, in a fourth possible implementation manner of the fourth aspect, the containers included in the CCR message separately carry one sequence number, sequence numbers of the containers are arranged in time sequence, and the OCS differentiates the containers in time sequence according to the sequence numbers of the containers.

According to the method and the apparatus for information exchange in online charging provided in the embodiments of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that the CTF device does not need to report the charging information to the OCS each time the corresponding event of the non-real-time Trigger happens. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

The embodiments of the present disclosure may be applied to an OCS. The OCS includes at least a CTF device and an OCS. The CTF device is a network device that can bear a CTF. For example, all devices that can bear the CTF, such as a Gateway General Packet Radio Service (GPRS) support node (GGSN), a packet data network (PDN) gateway (P-GW), and a Packet Data Gateway (PDG) may be referred to as the CTF device in the embodiments of the present disclosure. It should be noted that a specific type and a device model of the CTF device may be selected according to a specific network environment. For example, in a GPRS, the GGSN may serve as the CTF device. In an Evolved Packet Core (EPC) network, the P-GW may serve as the CTF device. In a Wireless Local Area Network (WLAN) an enhanced PDG (ePDG) may serve as the CTF device. A manner of information exchange between the CTF device and the OCS and a type of information transmitted between the CTF device and the OCS are not limited in the embodiments of the present disclosure. For convenience of description, the description is provided using an example in which the CTF device sends a CCR message to the OCS, and the OCS sends a CCA message to the CTF device. Both the CCR message and the CCA message may carry information or data content that needs to be exchanged in the embodiments of the present disclosure. For example, the CCR message may carry a quota request of a specified rating group, and the CCA message may carry quota authorization information and a Trigger such that the CTF device monitors a corresponding event of the Trigger according to the received CCA message, and sends the CCR message to the OCS according to the event that happens, where the CCR message carries charging information encapsulated for reporting, and the OCS sends, to the CTF device, the CCA message used to confirm that the reported charging information has been received.

Figure 1:
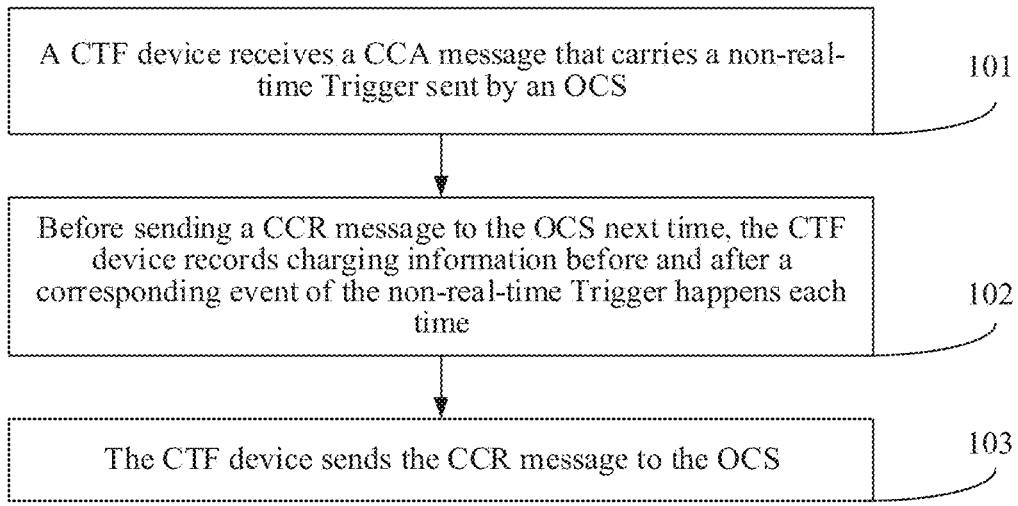
FIG. 1 is a flowchart of a method for information exchange in online charging according to an embodiment of the present disclosure.

An embodiment of the present disclosure provides a method for information exchange in online charging. As shown in FIG. 1, the method includes the following steps.

Step 101: A CTF device receives a CCA message that carries a non-real-time Trigger sent by an OCS.

The CCA message responds to a CCR message that carries a quota request sent by the CTF device, the non-real-time Trigger corresponds to one or more quotas of a rating group, and the non-real-time Trigger refers to when a corresponding event happens, the CTF device is triggered to record charging information before and after the corresponding event happens, and the CTF device is not triggered to report the recorded charging information to the OCS.

It should be noted that, in the non-real-time Trigger, the corresponding event may be one or more preset events, for example, and may include one or more events in Table 1 below.

TABLE 1

A user location changes.
Allocated QoS changes.
An accessed wireless network changes.
A serving gateway (or SGW support node (SGSN) address changes.
A serving gateway (SGSN or SGW) type changes.
A time zone in which a user is located changes.
A serving network PLMN changes.
User group information changes.

For example, the CTF device receives a CCA message sent by the OCS and indicates that a user location changes, or a CCA message sent by the OCS and indicates that user group information changes and a time zone in which a user is located changes.

It should be noted that the non-real-time Trigger may be implemented in multiple manners.

For example, in this embodiment of the present disclosure, the non-real-time Trigger is indicated using a new Trigger format (herein, a Record-Trigger is used as an example) different from an existing Trigger format:

Trigger::=<Attribute-Value Pairs (AVP) Header: 1264>
   * [Trigger-Type]
Record-Trigger::=<AVP Header:XXXX>
   * [Trigger-Type]

For another example, in this embodiment of the present disclosure, an existing Trigger format may be changed in order to add a child AVP to indicate a non-real-time Trigger (herein, a Deferred-Trigger-Type is used as an example), where the non-real-time Trigger includes one or more specific non-real-time Triggers (includes one or more child Trigger-Types):

Trigger::=<AVP Header:XXXX>
   * [Trigger-Type] [Deferred-Trigger-Type]
   * [Trigger-Type]

The non-real-time Trigger is included in the Deferred-Trigger-Type. After receiving an AVP, the CTF device removes the non-real-time Trigger included in the Deferred-Trigger-Type from a list of Triggers included in a Trigger-Type child AVP of the Trigger AVP, and the remaining other Triggers are used as real-time Triggers.

For another example, in this embodiment of the present disclosure, an existing Trigger format may be changed in order to indicate a non-real-time Trigger by means of grouping (herein, a non-real-time Trigger is indicated by means of a Non-Real-Trigger, and a real-time Trigger is indicated by means of a Real-Trigger):

Trigger::=<AVP Header: 1264>
   Real-Trigger::=<AVP Header:XXXX>
    * [Trigger-Type]
   Non-Real-Trigger::=<AVP Header:XXXX>
    * [Trigger-Type]

Optionally, after receiving the CCA message that carries the non-real-time Trigger sent by the OCS, the CTF device may further determine, according to a service usage status of a user, whether happening of the corresponding event needs to be monitored, and the CTF device ignores the non-real-time Trigger if the happening of the corresponding event does not need to be monitored.

Step 102: Before sending a CCR message to the OCS next time, the CTF device records charging information before and after a corresponding event of the non-real-time Trigger happens each time.

Before the CTF device sends the CCR message to the OCS next time, when the corresponding event of the non-real-time Trigger happens, the CTF device may obtain the charging information recorded in the CTF device when the corresponding event of the non-real-time Trigger happens, set the charging information as the charging information before the corresponding event of the non-real-time Trigger happens, restart a charging information recording process after obtaining the charging information before the corresponding event of the non-real-time Trigger happens, and set charging information recorded in restarted recording as the charging information after the corresponding event of the non-real-time Trigger happens. In this embodiment of the present disclosure, a granularity used by the CTF device to record the charging information may be a Rating Group granularity, or a Rating Group granularity and a Service identifier (ID) granularity. For a network device that bears the CTF, a recording granularity is kept the same as a reporting granularity, and the recording granularity may be a reporting granularity specified in a charging rule delivered by a Policy and Charging Rules Function (PCRF).

Step 103: The CTF device sends the CCR message to the OCS.

The CCR message includes the charging information before and after the corresponding event of the non-real-time Trigger happens each time, and the CTF sends the CCR message to the OCS when a reporting condition is satisfied. The reporting condition herein may be, a quota is used up, a quota expires, a corresponding event of a real-time Trigger happens, or the like.

For example, when a corresponding event of a real-time Trigger corresponding to a rating group happens, the CTF device encapsulates charging information before and after the event happens each time. For example, charging information of the Rating Group granularity is encapsulated if the reporting granularity is the Rating Group granularity, and charging information of the intersection set of the Rating Group granularity and the Service ID granularity is encapsulated if the reporting granularity is an intersection set of the Rating Group granularity and the Service ID granularity.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, charging information before and after the event happens can be first recorded when a corresponding event of a non-real-time Trigger happens, and charging information before and after the event happens each time can be carried in a CCR message and then reported to the OCS when the charging information needs to be reported to an OCS, thereby preventing a CTF device from frequently reporting the charging information to the OCS, reducing frequency of information exchange between the CTF device and the OCS, and reducing a pressure of information transmission between the CTF device and the OCS.

Figure 2:
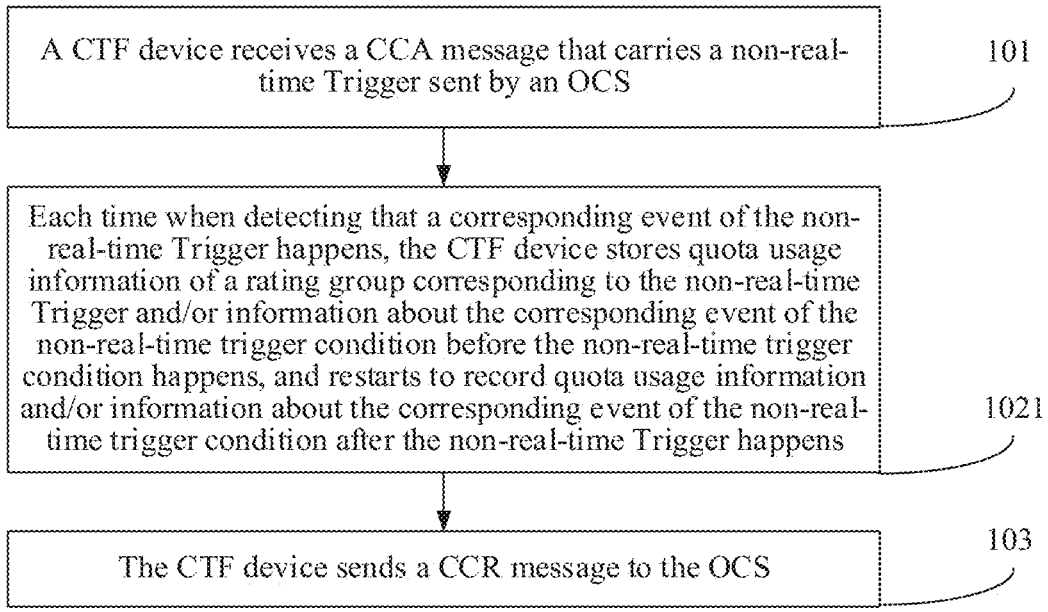
FIG. 2 is a flowchart of another method for information exchange in online charging according to an embodiment of the present disclosure.

In this embodiment of the present disclosure, on the basis of the implementation manner shown in FIG. 1, step 102 may be implemented as 1021 shown in FIG. 2.

Step 1021: Each time when detecting that the corresponding event of the non-real-time Trigger happens, the CTF device stores quota usage information of a rating group corresponding to the non-real-time Trigger and/or information about the corresponding event of the non-real-time Trigger before the non-real-time Trigger happens, and restarts to record quota usage information and/or information about the corresponding event of the non-real-time Trigger after the non-real-time Trigger happens.

Before the CTF device sends the CCR message to the OCS next time, when the corresponding event of the non-real-time Trigger happens, the CTF device may store the quota usage information of the rating group corresponding to the non-real-time Trigger and/or the information about the corresponding event of the non-real-time Trigger before the non-real-time Trigger happens, obtain quota usage information and/or information about the corresponding event of the non-real-time Trigger, which is recorded in the CTF device when the corresponding event of the non-real-time Trigger happens, set the obtained information as quota usage information and/or information about the corresponding event of the non-real-time Trigger before the corresponding event of the non-real-time Trigger happens, after obtaining the quota usage information and/or the information about the corresponding event of the non-real-time Trigger before the corresponding event of the non-real-time Trigger happens, restart a charging information recording process, and restart to record the quota usage information and/or the information about the corresponding event of the non-real-time Trigger after the non-real-time Trigger happens.

According to the method for information exchange in online charging provided in this embodiment of the present disclosure, a CTF device can receive a CCA message that carries a non-real-time Trigger sent by an OCS, and before sending a CCR message to the OCS next time, the CTF device stores quota usage information of a rating group corresponding to the non-real-time Trigger and/or information about a corresponding event of the non-real-time Trigger before the non-real-time Trigger happens, restarts to record quota usage information and/or information about the corresponding event of the non-real-time Trigger after the non-real-time Trigger happens, and sends the CCR message carrying recorded charging information to the OCS such that a CCR message reported each time by the CTF device to the OCS carries charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 3:
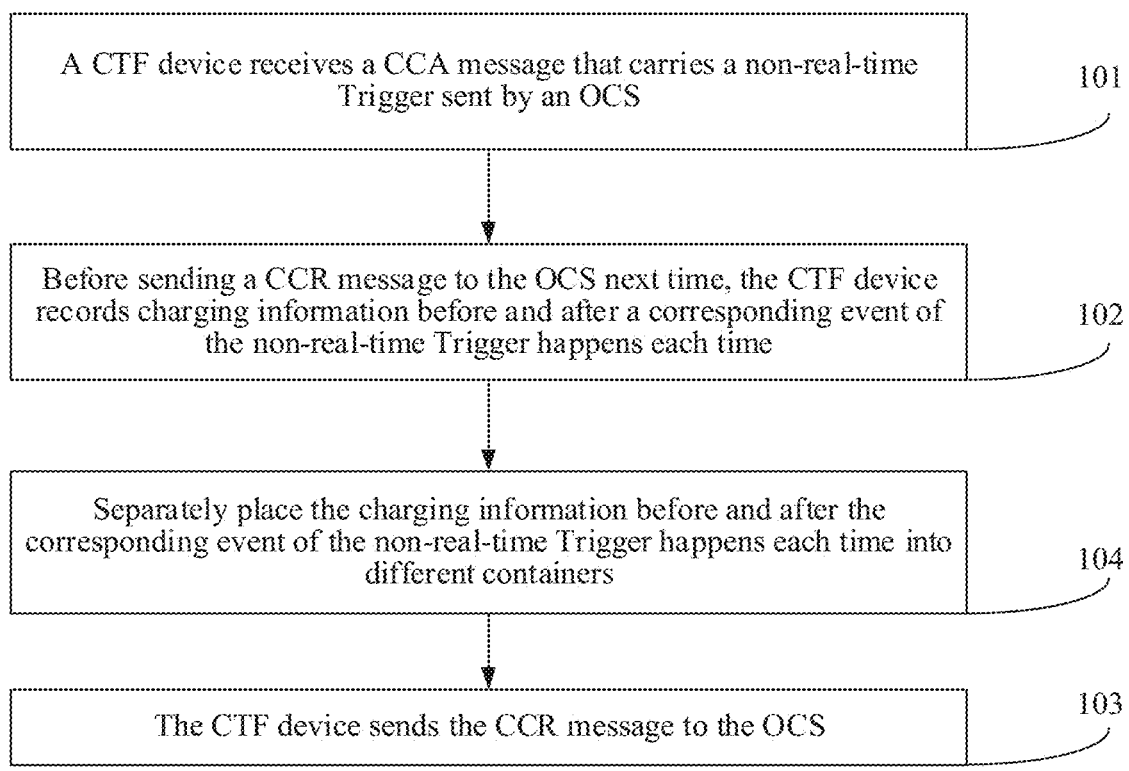
FIG. 3 and FIG. 4 are a flowchart of another method for information exchange in online charging according to an embodiment of the present disclosure.
Figure 4:
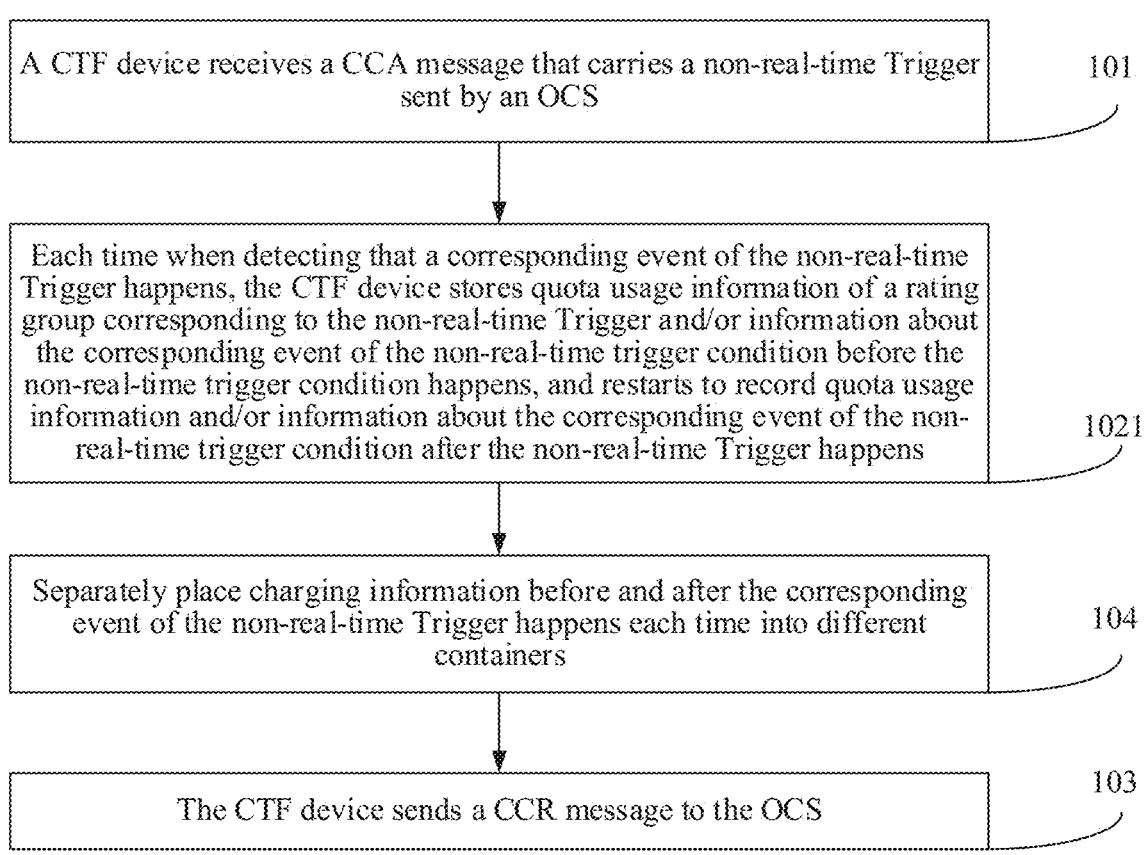

In this embodiment of the present disclosure, on the basis of the implementation manner shown in FIG. 1 or FIG. 2, as shown in FIG. 3 or FIG. 4, before step 103, the method may further include step 104.

Step 104: Separately place the charging information before and after the corresponding event of the non-real-time Trigger happens each time into different containers.

The CCR message includes at least two containers.

The charging information includes one or more of the quota usage information recorded by the CTF device, the non-real-time Trigger, or the information about the corresponding event of the non-real-time Trigger. The non-real-time Trigger includes one or more of a user location changes, an allocated QoS value changes, an accessed wireless network type changes, a serving gateway address changes, a serving gateway type changes, a time zone in which a user is located changes, or a serving network PLMN changes, and the information about the corresponding event of the non-real-time Trigger includes at least one or more values of the user location, the allocated QOS value, the accessed wireless network type, the serving gateway address, the serving gateway type, the time zone in which the user is located, or the serving network PLMN.

In this embodiment of the present disclosure, the CCR message includes the charging information before and after the corresponding event of the non-real-time Trigger happens each time, and the CCR message includes at least two containers. The CTF device separately places the charging information before and after the corresponding event of the non-real-time Trigger happens into different containers. If the corresponding event of the non-real-time Trigger happens for multiple times, a corresponding quantity of containers may be used to record charging information before the corresponding event of the non-real-time Trigger happens each time, and one container records information after the corresponding event of the non-real-time Trigger happens for the last time and before the CTF device sends the CCR message to the OCS.

Figure 5:
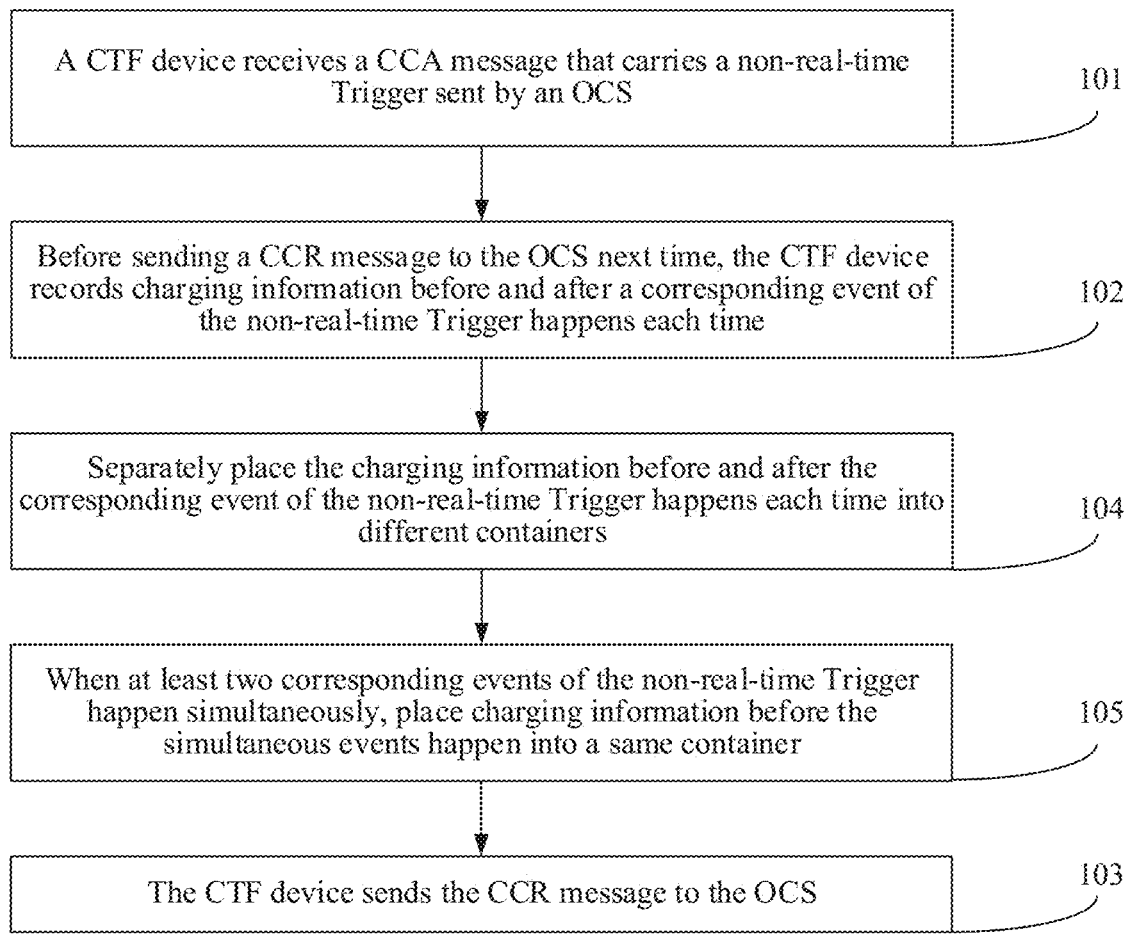
FIG. 5 and FIG. 6 are a flowchart of another method for information exchange in online charging according to an embodiment of the present disclosure.
Figure 6:
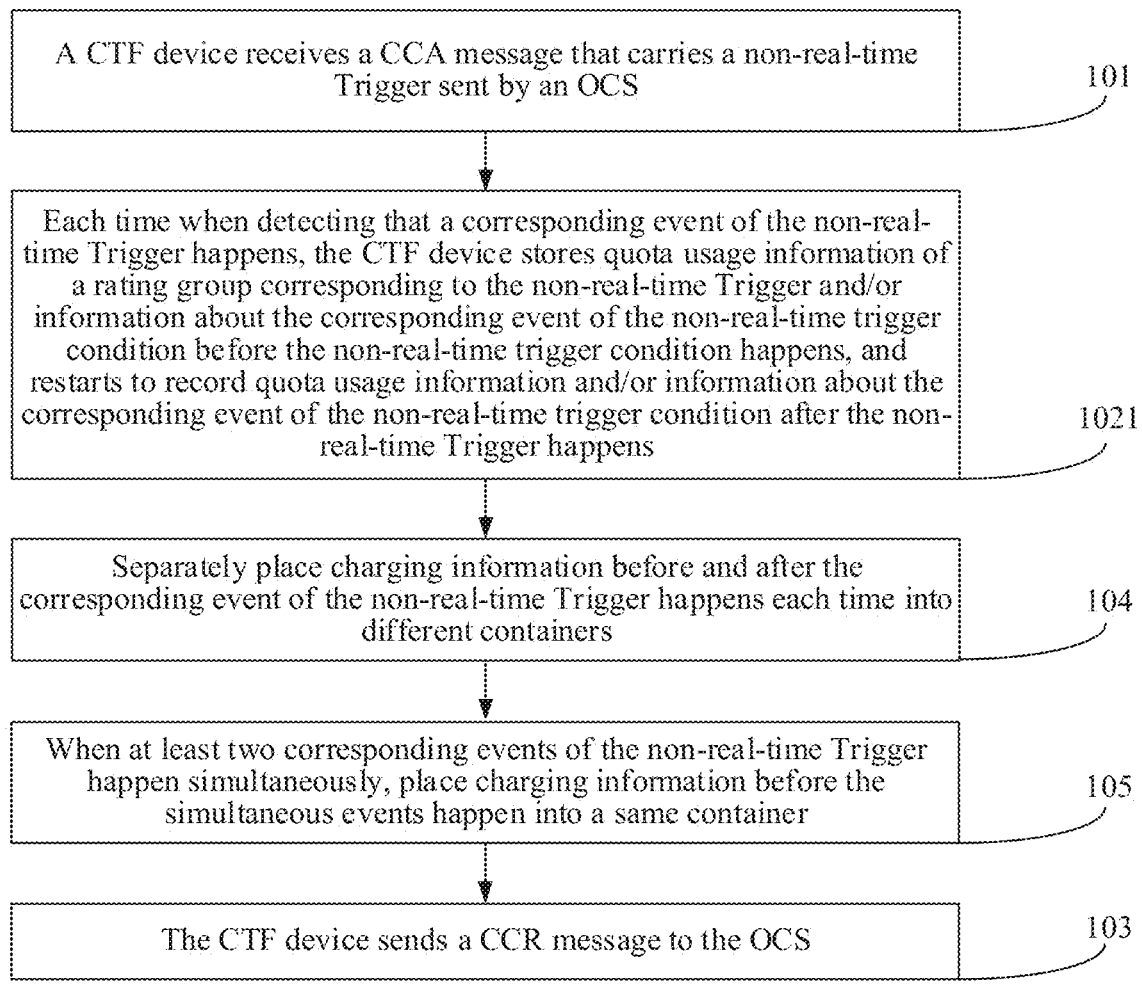

In this embodiment of the present disclosure, on the basis of the implementation manner shown in FIG. 3 or FIG. 4, before the CTF device sends the CCR message to the OCS, the method may be further implemented as either implementation manner shown in FIG. 5 or FIG. 6.

Step 105: When at least two corresponding events of the non-real-time Trigger happen simultaneously, place charging information before the simultaneous events happen into a same container.

When multiple corresponding events of the non-real-time Trigger happen simultaneously, the CTF device combines and records charging information corresponding to the multiple corresponding events of the non-real-time Triggers in order to report the recorded information as one container to the OCS.

In this embodiment of the present disclosure, on the basis of the implementation manner shown in FIG. 3 or FIG. 4, information in the container includes the quota usage information of the rating group corresponding to the non-real-time Trigger and/or information about all corresponding events of the non-real-time Trigger before the non-real-time Trigger happens.

It should be noted that, no matter whether the OCS has delivered a non-real-time Trigger corresponding to an event, information corresponding to all non-real-time Triggers is reported in each container.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, separately place the charging information into different containers, and send the CCR message carrying the recorded charging information to the OCS such that a CCR message reported each time by the CTF device to the OCS carries the charging information before the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before the event happens each time can be carried in different containers in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 7:
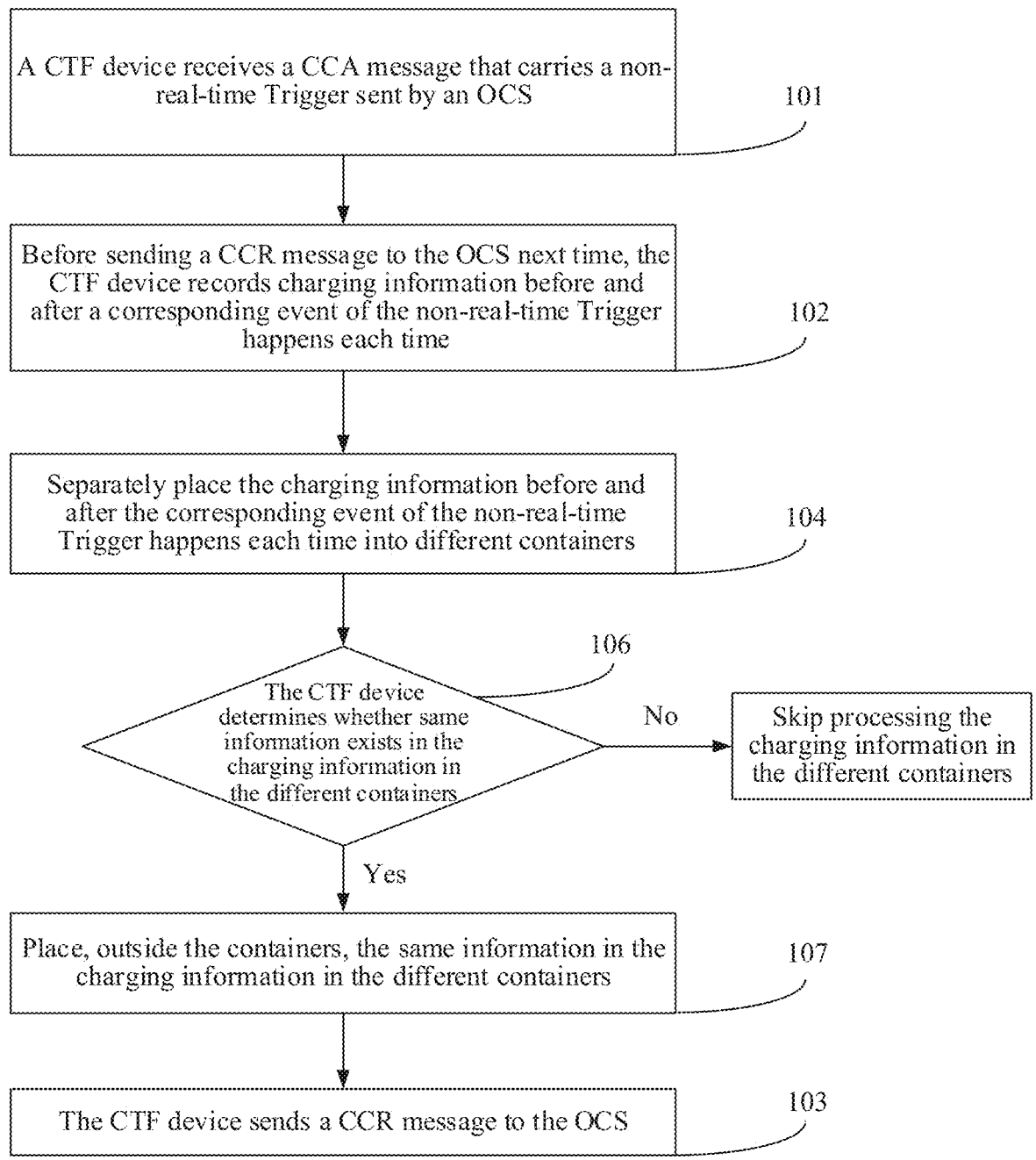
FIG. 7 and FIG. 8 are a flowchart of another method for information exchange in online charging according to an embodiment of the present disclosure.
Figure 8:
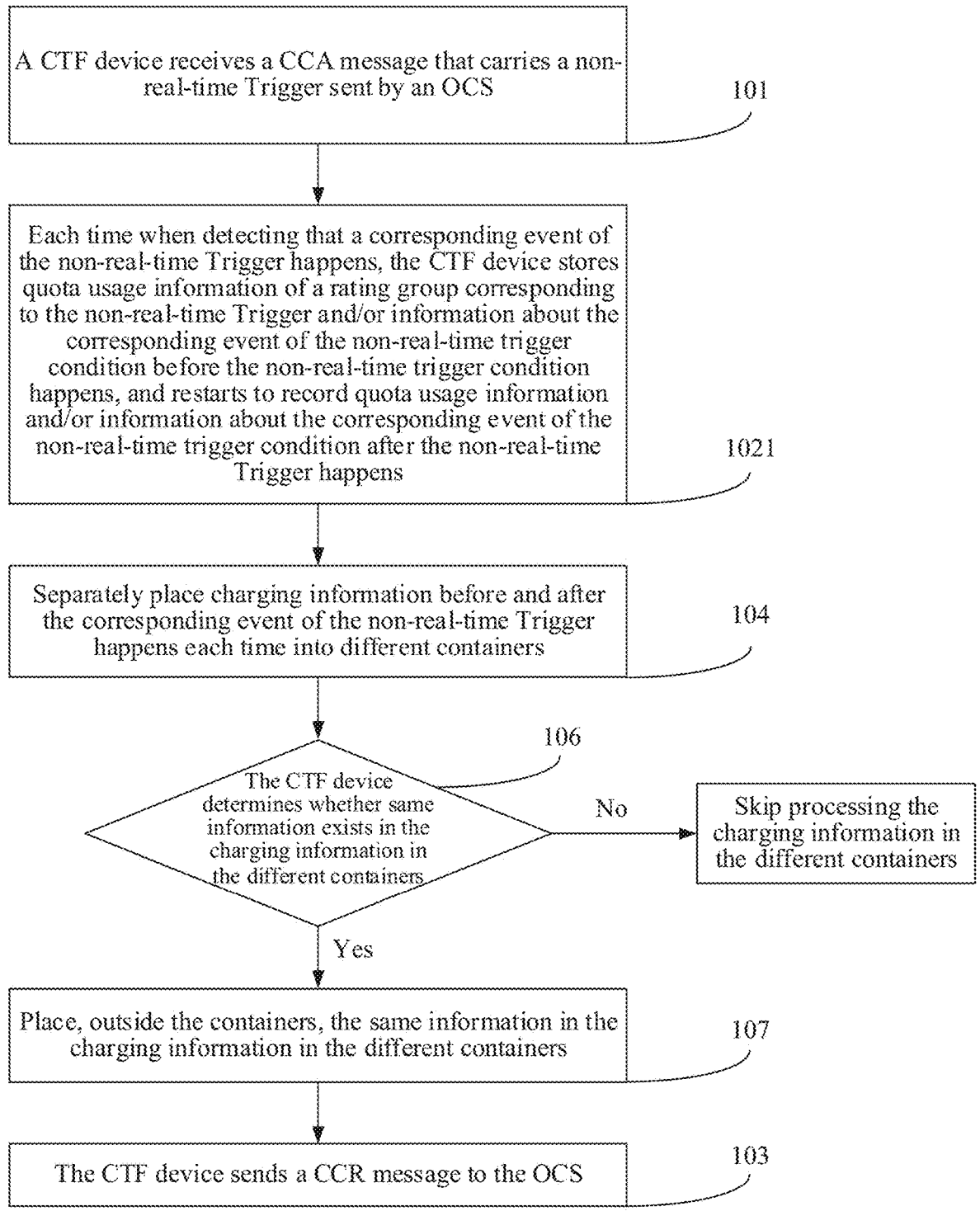

In this embodiment of the present disclosure, on the basis of the implementation manner shown in FIG. 3 or FIG. 4, before the CTF device sends the CCR message to the OCS, the method may be further implemented as an implementation manner shown in FIG. 7 or FIG. 8.

Step 106: The CTF device determines whether same information exists in the charging information in the different containers.

Step 107: If the same information exists in the charging information in the different containers, place, outside the containers, the same information in the charging information in the different containers.

The charging information in the different containers is not processed if no same information exists in the charging information in the different containers.

In this embodiment of the present disclosure, the CTF device performs determining on charging information, that is, determines whether same information exists in charging information in different containers. The same charging information is placed outside the containers and reported as information at a Packet Switched (PS)-information level if some charging information in different containers and reported in a same CCR message is the same, thereby preventing a large amount of repetitive information from being reported.

For example, if user time zones corresponding to charging information in different containers and reported in a same CCR message are the same, the information is reported in an AVP at a PS-information level, and the containers do not carry user time zone information any more. If the user time zones are different, time zone information is encapsulated in different containers for reporting. Each Service-Data-Record may correspond to a set of charging information before or after one non-real-time Trigger or multiple simultaneous non-real-time Triggers happen. If values of a parameter, such as Location, in all Service-Data-Records at the PS-information level are the same, one Location AVP is carried only at the PS-information level, and the Location AVP is no longer carried in any Service-Data-Record.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, separately place the charging information into different containers, place, outside the containers, same information in the charging information in the different containers, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded and separately placed into different containers, then same information in the charging information in the different containers can be placed outside the containers, reducing storage resources, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

In this embodiment of the present disclosure, on the basis of the implementation manner shown in FIG. 3 or FIG. 4, information in the container may include the quota usage information of the rating group corresponding to the non-real-time Trigger before the corresponding event of the non-real-time Trigger happens and information about all corresponding events that have happened in a current reporting period and of the non-real-time Trigger sent by the OCS.

In this embodiment of the present disclosure, the current reporting period is a time interval from a time when charging information is reported previous time to a time when charging information is reported next time.

Charging information in a container is divided into quota usage information and information that corresponds to the non-real-time Trigger. At the time of reporting, the container carries only information about a corresponding event that has happened and that is of the non-real-time Trigger delivered by the OCS and quota usage information, and does not carry information about another corresponding event that does not happen or of a non-real-time Trigger or information about another corresponding event of a non-real-time Trigger that is not delivered by the OCS. The information about the corresponding event of the non-real-time Trigger not carried in the container may be carried outside the container.

For example, a non-real-time Trigger delivered by the OCS is that a Location changes. It is assumed that the Location changes once in a reporting period, and then, when reporting is triggered, only information and quota usage information before and after the Location changes are encapsulated into a container, and the container does not carry information about a corresponding event of another non-real-time Trigger. A value of the corresponding event of the other non-real-time Trigger is carried at the PS-information level, and the value of the corresponding event of another non-real-time Trigger is current information. Details are described in Table 2.

TABLE 2

| Specific code | Code meaning |
| --- | --- |
| Service-Data-Record ::=<br>< AVP Header: XXX><br>  [ Accounting-Input-Octets ]<br>  [ Accounting-Output-Octets ]<br>  [ Local-Sequence-Number ]<br>  [ Rating-Group ]<br>  [ Change-Time ]<br>  [ Service-Identifier ]<br>  [ Service-Specific-Info ]<br>  [ Time-Usage ]<br>  [ Trigger ]<br>  [ third Generation Partnership Project (3GPP)-User-Location-Info ]<br>  [ 3GPP2-BSID ] | Quota usage information<br><br><br><br><br><br><br><br><br><br>Non-real-time Trigger: CHANGE_IN_LOCATION For information corresponding to a non-real-time Trigger, only a value corresponding to a Location is reported. |

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, place charging information before simultaneous events happen into a same container, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, charging information before simultaneous events happen can be placed into a same container, reducing a quantity of occupied containers, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

In this embodiment of the present disclosure, on the basis of the implementation manner shown in FIG. 3 or FIG. 4, the information in the container may further include the quota usage information of the rating group corresponding to the non-real-time Trigger before the corresponding event of the non-real-time Trigger happens and information about all corresponding events of the non-real-time Trigger sent by the OCS.

Further, when the non-real-time Trigger happens, a container carries values, before the non-real-time Trigger happens, of all corresponding events of the non-real-time Trigger sent by the OCS. Herein, the values include a value of a corresponding event that happens and of the non-real-time Trigger and a value of a corresponding event that does not happen and of the non-real-time Trigger, and a value of a corresponding event of another non-real-time Trigger not delivered by the OCS is not carried.

Further, a container into which charging information in a time period from a time when the last corresponding event of the non-real-time Trigger happens to a reporting time point is encapsulated may carry values, at the time of reporting, of all corresponding events of the non-real-time Trigger sent by the OCS, or may not carry a value of any corresponding event of the non-real-time Trigger. The value not carried in the container and of the corresponding event of the non-real-time Trigger is carried in a parameter at the PS-information level.

For example, a non-real-time Trigger delivered by the OCS is that a Location changes, and QoS changes. It is assumed that the Location changes once in a reporting period, and then, when reporting is triggered, a Location value and a QoS value before and after the Location changes are encapsulated into a container. Information about a corresponding event of another non-real-time Trigger not delivered by the OCS, for example, a time zone changes, or a serving gateway changes, is carried at the PS-information level, and a value of the corresponding event of the other non-real-time Trigger is current information. Details are described in Table 3.

TABLE 3

| Specific code | Code meaning |
| --- | --- |
| Service-Data-Record ::=<br>< AVP Header: XXX><br>  [ Accounting-Input-Octets ]<br>  [ Accounting-Output-Octets ]<br>  [ Local-Sequence-Number ]<br>  [ Rating-Group ]<br>  [ Change-Time ]<br>  [ Service-Identifier ]<br>  [ Service-Specific-Info ]<br>  [ Time-Usage ]<br>  [ Trigger ]<br>  [ CHANGE_IN_LOCATION ]<br>  [ 3GPP-User-Location-Info ]<br>  [ QoS-information ] | Before a Location changes, for information corresponding to a non-real-time Trigger, information corresponding to the Location and QoS is encapsulated. |
| Service-Data-Record ::=<br>< AVP Header: XXX><br>  [ Accounting-Input-Octets ]<br>  [ Accounting-Output-Octets ]<br>  [ Local-Sequence-Number ]<br>  [ Rating-Group ]<br>  [ Change-Time ]<br>  [ Service-Identifier ]<br>  [ Service-Specific-Info ]<br>  [ Time-Usage ]<br>  [ Trigger ]<br>  [ CHANGE_IN_LOCATION ]<br>  [ 3GPP-User-Location-Info ]<br>  [ QoS-information ] | After a Location changes, for information corresponding to a non-real-time Trigger, information corresponding to the Location and QoS is encapsulated. |

In this embodiment of the present disclosure, on the basis of the foregoing implementation manner, the container further includes the non-real-time Trigger if the information in the container is information before the corresponding event of the non-real-time Trigger happens, or the container does not include any non-real-time Trigger if the information in the container is information after the corresponding event of the non-real-time Trigger happens for the last time and before the CTF device sends the CCR message to the OCS.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and charging information recorded by the CTF device after the corresponding event of the non-real-time Trigger happens for the last time and before the CTF device sends the CCR message to the OCS, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens and information after the event happens for the last time and before a CTF device sends a CCR message to an OCS can be first recorded, and when the charging information needs to be reported to the OCS, charging information before and after the event happens each time can be carried in a CCR message and then reported to the OCS, thereby preventing the CTF device from frequently reporting the charging information to the OCS, reducing frequency of information exchange between the CTF device and the OCS, and reducing a pressure of information transmission between the CTF device and the OCS.

In this embodiment of the present disclosure, the containers included in the CCR message may separately carry one sequence number, and sequence numbers of the containers are arranged in time sequence such that the OCS differentiates the containers in time sequence according to the sequence numbers of the containers. Each container carries one sequence number such that the OCS can differentiate containers according to sequence numbers. The OCS may further identify, according to Trigger information carried in a container, that is, whether a Trigger-type is carried, a container in which charging information after the last non-real-time Trigger changes is placed. The CTF device places charging information corresponding to multiple simultaneous non-real-time Triggers into a same container such that the OCS can learn simultaneous events.

According to the method for information exchange in online charging that is provided in this embodiment of the present disclosure, a CTF device can receive a CCA message that carries a non-real-time Trigger sent by an OCS, before sending a CCR message to the OCS next time, record charging information before a corresponding event of the non-real-time Trigger happens each time, where containers included in the CCR message separately carry one sequence number, and send the CCR message carrying the recorded charging information to the OCS such that a CCR message reported each time by the CTF device to the OCS carries charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, where containers included in a CCR message separately carry one sequence number such that an OCS differentiates the containers in time sequence according to sequence numbers of the containers, and when the charging information needs to be reported to the OCS, charging information before the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

If corresponding events of a real-time Trigger and the non-real-time Trigger carried in the CCA message sent by the OCS are the same, the CTF device sends the CCR message to the OCS when the event happens, that is, the CTF device uses the event as the real-time Trigger.

The CTF device replaces the received non-real-time Trigger with the new non-real-time Trigger when the CTF device receives again a CCA message that carries a new non-real-time Trigger sent by the OCS.

The previously delivered non-real-time Trigger is replaced with a new non-real-time Trigger, that is, the previously delivered non-real-time Trigger is invalid if the OCS has delivered a non-real-time Trigger to the CTF device within this charging session declaration period, and currently the non-real-time Trigger is still valid.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time, and when the CTF device receives again a CCA message that carries a new non-real-time Trigger sent by the OCS, the CTF device replaces the received non-real-time Trigger with the new non-real-time Trigger. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 9:
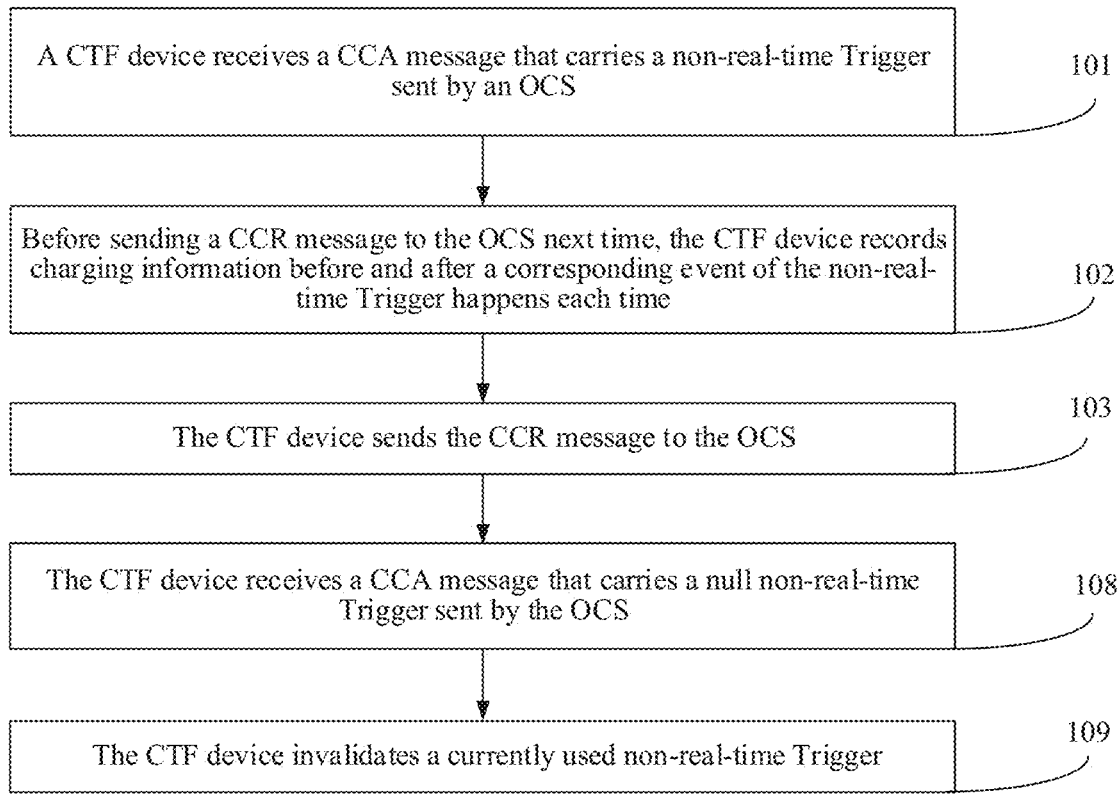
FIG. 9 is a flowchart of another method for information exchange in online charging according to an embodiment of the present disclosure.

In this embodiment of the present disclosure, on the basis of the implementation manners shown in FIG. 1 to FIG. 8, using FIG. 1 as an example, the method may be further implemented as an implementation manner shown in FIG. 9.

Step 108: The CTF device receives a CCA message that carries a null non-real-time Trigger sent by the OCS.

The null non-real-time Trigger does not correspond to any event.

Step 109: The CTF device invalidates a currently used non-real-time Trigger.

The CTF device invalidates all currently used non-real-time Triggers if the OCS delivers the CCA message carrying the null non-real-time Trigger to the CTF device, where the null non-real-time Trigger does not carry a corresponding event of any specific non-real-time Trigger.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time, and the CTF device validates a currently used non-real-time Trigger when the CTF device receives a CCA message that carries a null non-real-time Trigger sent by the OCS. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 10A:
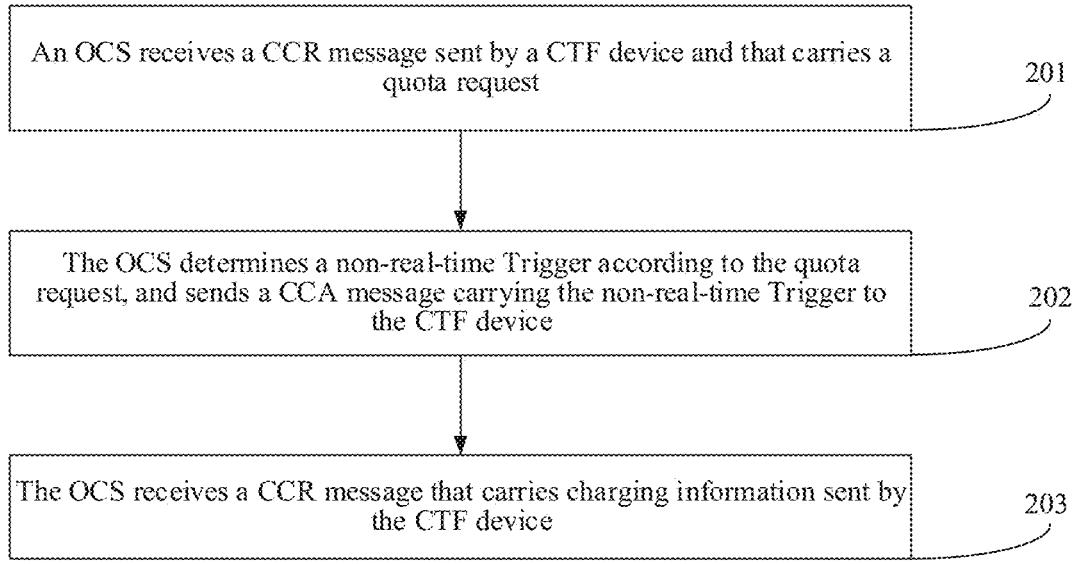
FIG. 10A is a flowchart of another method for information exchange in online charging according to an embodiment of the present disclosure.

An embodiment of the present disclosure provides a method for information exchange in online charging. As shown in FIG. 10A, the method includes the following steps.

Step 201: An OCS receives a CCR message sent by a CTF device and that carries a quota request.

Step 202: The OCS determines a non-real-time Trigger according to the quota request, and sends a CCA message carrying the non-real-time Trigger to the CTF device.

The non-real-time Trigger corresponds to one or more quotas of a rating group, and the non-real-time Trigger refers to when a corresponding event happens, the CTF device is triggered to record charging information before and after the event happens, and the CTF device is not triggered to report the recorded charging information to the OCS.

Step 203: The OCS receives a CCR message that carries charging information sent by the CTF device.

The CCR message includes charging information before and after the corresponding event of the non-real-time Trigger happens each time.

Figure 10B:
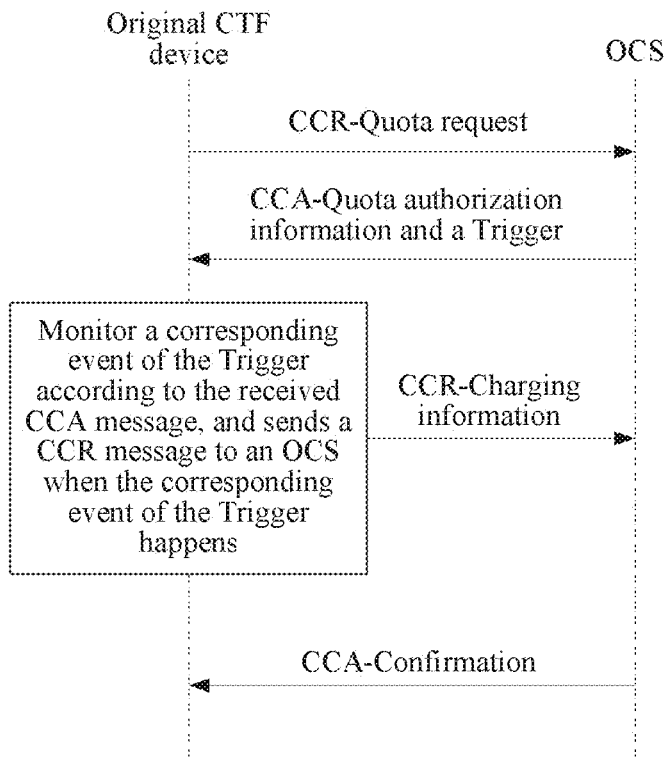
FIG. 10B is a flowchart of information exchange in a scenario according to an embodiment of the present disclosure.

As shown in FIG. 10B, an original process of information exchange between the CTF device and the OCS is as follows.

The CTF device sends a CCR message to the OCS, and the OCS sends a CCA message to the CTF device, where the CCR message may carry a quota request of a specified rating group, and the CCA message may carry quota authorization information and a Trigger. The CTF device monitors a corresponding event of the Trigger according to the received CCA message, and sends a CCR message to the OCS when the corresponding event of the Trigger happens, where the CCR message carries charging information encapsulated for reporting. The OCS sends, to the CTF device, a CCA message used to confirm that the reported charging information has been received.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 11:
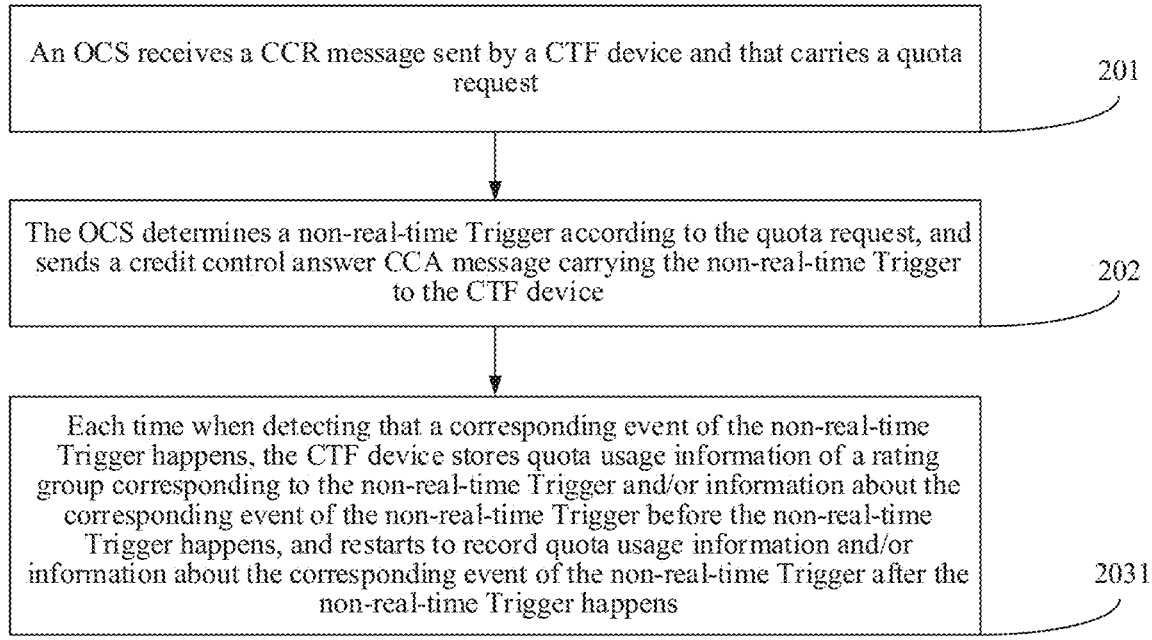
FIG. 11 is a flowchart of another method for information exchange in online charging according to an embodiment of the present disclosure.

In this embodiment of the present disclosure, on the basis of the implementation manner shown in FIG. 10A, step 203 may be implemented as step 2031 shown in FIG. 11.

Step 2031: Each time when detecting that a corresponding event of the non-real-time Trigger happens, the CTF device stores quota usage information of a rating group corresponding to the non-real-time Trigger and/or information about the corresponding event of the non-real-time Trigger before the non-real-time Trigger happens, and restarts to record quota usage information and/or information about the corresponding event of the non-real-time Trigger after the non-real-time Trigger happens.

According to the method for information exchange in online charging provided in this embodiment of the present disclosure, a CTF device can receive a CCA message that carries a non-real-time Trigger sent by an OCS, and before sending a CCR message to the OCS next time, the CTF device can store quota usage information of a rating group corresponding to the non-real-time Trigger and/or information about the corresponding event of the non-real-time Trigger before the non-real-time Trigger happens, restart to record quota usage information and/or information about the corresponding event of the non-real-time Trigger after the non-real-time Trigger happens, record charging information before and after the corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

In this embodiment of the present disclosure, on the basis of the implementation manner shown in FIG. 10A or FIG. 11, the CCR message carrying the charging information includes at least two containers, and the charging information before and after the corresponding event of the non-real-time Trigger happens each time is separately placed into different containers.

The charging information includes one or more of the quota usage information recorded by the CTF device, the non-real-time Trigger, or the information about the corresponding event of the non-real-time Trigger. The non-real-time Trigger includes one or more of a user location changes, an allocated QoS value changes, an accessed wireless network type changes, a serving gateway address changes, a serving gateway type changes, a time zone in which a user is located changes, or a serving network PLMN changes, and the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

Information in the container may include the quota usage information of the rating group corresponding to the non-real-time Trigger and/or information about all corresponding events of the non-real-time Trigger before the non-real-time Trigger happens.

The information in the container may further include multiple non-real-time Triggers. This means that corresponding events of the multiple non-real-time Triggers happen simultaneously, and charging information in the container is charging information before the corresponding events of the multiple non-real-time Triggers happen.

The information in the container may further include the quota usage information of the rating group corresponding to the non-real-time Trigger before the corresponding event of the non-real-time Trigger happens and information about all corresponding events that have happened in a current reporting period and of the non-real-time Trigger sent by the OCS.

The information in the container may further include the quota usage information of the rating group corresponding to the non-real-time Trigger before the corresponding event of the non-real-time Trigger happens and information about all corresponding events of the non-real-time Trigger sent by the OCS. In other words, no matter whether a corresponding event of a non-real-time Trigger sent by the OCS happens, the non-real-time Trigger is included in the container as long as the non-real-time Trigger is delivered by the OCS.

In this embodiment of the present disclosure, if the container further includes the non-real-time Trigger, the information in the container includes quota usage information before the corresponding event of the non-real-time Trigger happens.

If the container does not include any non-real-time Trigger, the information in the container is information after the corresponding event of the non-real-time Trigger happens for the last time and before the CTF device sends the CCR message to the OCS.

According to the method for information exchange in online charging that is provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, separately place the charging information into different containers, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in different containers in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

The containers included in the CCR message separately carry one sequence number, and sequence numbers of the containers are arranged in time sequence such that the sequence numbers of the containers are used by the OCS to differentiate the containers in time sequence.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, where containers included in the CCR message separately carry one sequence number, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, where containers included in a CCR message separately carry one sequence number such that an OCS differentiates the containers in time sequence according to sequence numbers of the containers, and when the charging information needs to be reported to the OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 12:
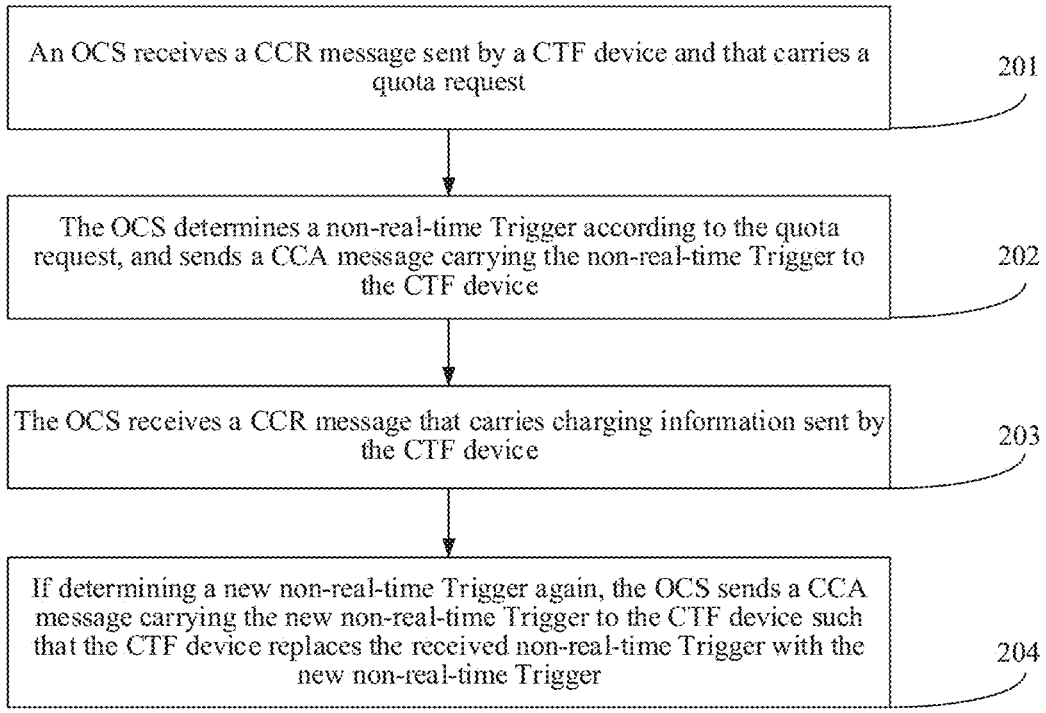
FIG. 12 is a flowchart of another method for information exchange in online charging according to an embodiment of the present disclosure.

In this embodiment of the present disclosure, on the basis of the implementation manner shown in FIG. 10A, the method may further include an implementation manner shown in FIG. 12.

Step 204: If determining a new non-real-time Trigger again, the OCS sends a CCA message carrying the new non-real-time Trigger to the CTF device such that the CTF device replaces the received non-real-time Trigger with the new non-real-time Trigger.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time, and when the CTF device receives again a CCA message that carries a new non-real-time Trigger sent by the OCS, the CTF device replaces the received non-real-time Trigger with the new non-real-time Trigger. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 13:
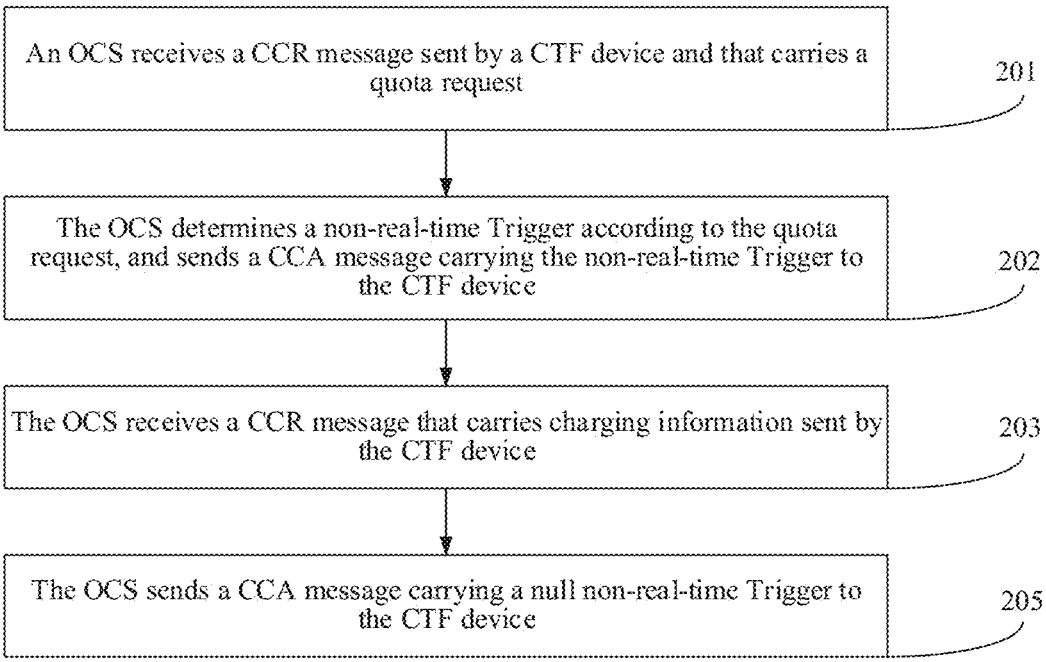
FIG. 13 is a flowchart of another method for information exchange in online charging according to an embodiment of the present disclosure.

In this embodiment of the present disclosure, on the basis of the implementation manner shown in FIG. 10A, the method may further include an implementation manner shown in FIG. 13.

Step 205: The OCS sends a CCA message carrying a null non-real-time Trigger to the CTF device.

The null non-real-time Trigger does not correspond to any event such that after receiving the CCA message that carries the null non-real-time Trigger, the CTF device invalidates a currently used non-real-time Trigger.

According to the method for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time, and when the CTF device receives a CCA message that carries a null non-real-time Trigger sent by the OCS, the CTF device validates a currently used non-real-time Trigger. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 14:
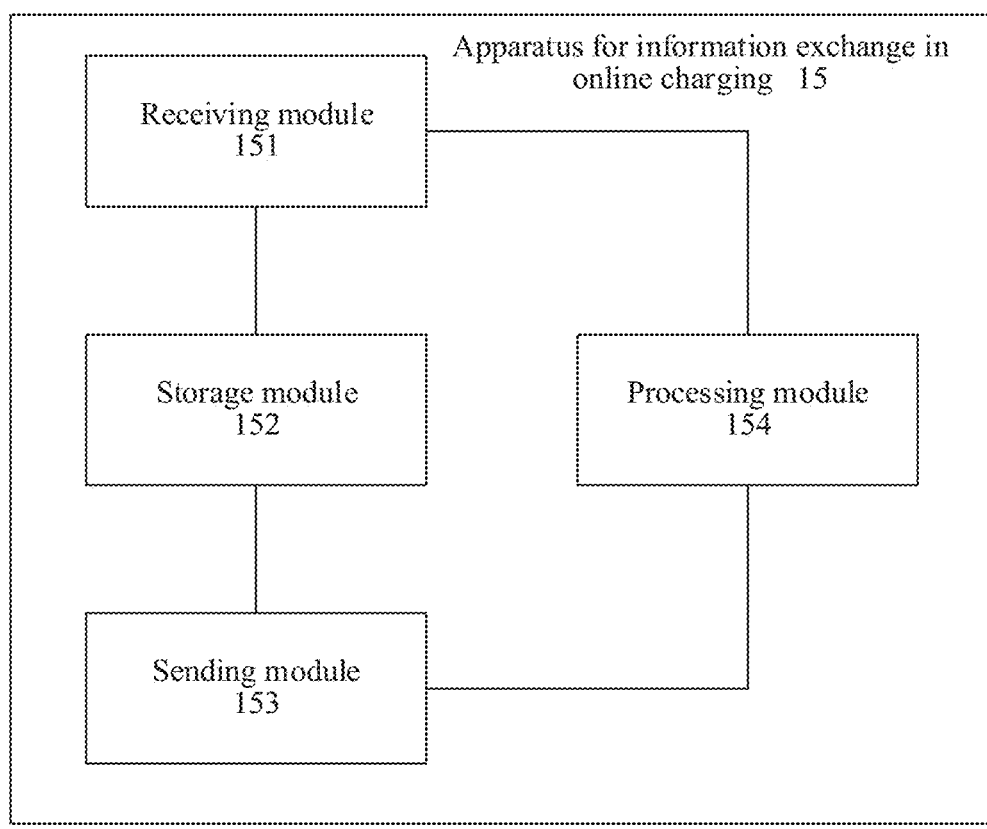
FIG. 14 is a schematic structural diagram of an apparatus for information exchange in online charging according to an embodiment of the present disclosure.

An embodiment of the present disclosure further provides an apparatus for information exchange in online charging 15 and that may be applied to a CTF device. As shown in FIG. 14, the apparatus for information exchange in online charging 15 may include a receiving module 151, a storage module 152, a sending module 153, and a processing module 154.

The receiving module 151 is configured to receive a CCA message that carries a non-real-time Trigger sent by an OCS, where the CCA message responds to a CCR message that carries a quota request sent by a CTF device, the non-real-time Trigger corresponds to one or more quotas of a rating group, and the non-real-time Trigger refers to when a corresponding event happens, the CTF device is triggered to record charging information before and after the event happens, and the CTF device is not triggered to report the recorded charging information to the OCS.

The storage module 152 is configured to record, before a CCR message is sent to the OCS next time, charging information before and after the corresponding event of the non-real-time Trigger happens each time.

The sending module 153 is configured to send the CCR message to the OCS, where the CCR message includes the charging information before and after the corresponding event of the non-real-time Trigger happens each time.

Optionally, each time when it is detected that the corresponding event of the non-real-time Trigger happens, the storage module 152 is further configured to store quota usage information of the rating group corresponding to the non-real-time Trigger and/or information about the corresponding event of the non-real-time Trigger before the non-real-time Trigger happens, and restart to record quota usage information and/or information about the corresponding event of the non-real-time Trigger after the non-real-time Trigger happens.

Optionally, before the CTF device sends the CCR message to the OCS, the storage module 152 is further configured to separately place the charging information before and after the corresponding event of the non-real-time Trigger happens each time into different containers, where the CCR message includes at least two containers, and the charging information includes one or more of the quota usage information recorded by the CTF device, the non-real-time Trigger, or the information about the corresponding event of the non-real-time Trigger, where the non-real-time Trigger includes one or more of the following a user location changes, an allocated QOS value changes, an accessed wireless network type changes, a serving gateway address changes, a serving gateway type changes, a time zone in which a user is located changes, or a serving network PLMN changes, and where the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

Optionally, the storage module 152 is further configured to place charging information before the simultaneous events happen into a same container when at least two corresponding events of the non-real-time Trigger happen simultaneously.

In an optional implementation solution, information in the container may include the quota usage information of the rating group corresponding to the non-real-time Trigger and/or information about all corresponding events of the non-real-time Trigger before the non-real-time Trigger happens.

In another optional implementation solution, information in the container includes the quota usage information before the corresponding event of the non-real-time Trigger happens and information about all corresponding events that have happened in a current reporting period and of the non-real-time Trigger sent by the OCS.

In still another optional implementation solution, information in the container includes the quota usage information before the corresponding event of the non-real-time Trigger happens and information about all corresponding events of the non-real-time Trigger sent by the OCS.

The processing module 154 is configured to determine whether same information exists in the charging information in the different containers before the CTF device sends the CCR message to the OCS, and place, outside the containers, the same information in the charging information in the different containers if the same information exists.

In the foregoing implementation solution, the container further includes the non-real-time Trigger if the information in the container is information before the corresponding event of the non-real-time Trigger happens, or the container does not include any non-real-time Trigger if the information in the container is information after the corresponding event of the non-real-time Trigger happens for the last time and before the CTF device sends the CCR message to the OCS.

Optionally, the containers included in the CCR message separately carry one sequence number, and sequence numbers of the containers are arranged in time sequence such that the OCS differentiates the containers in time sequence according to the sequence numbers of the containers.

Optionally, the sending module 153 is further configured to send the CCR message to the OCS when the event happens if corresponding events of a real-time Trigger and the non-real-time Trigger carried in the CCA message sent by the OCS are the same.

Optionally, the receiving module 151 is further configured to receive again a CCA that carries a new non-real-time Trigger sent by the OCS, where the CTF device has received the non-real-time Trigger sent by the OCS, and the processing module 154 is further configured to replace the received non-real-time Trigger with the new non-real-time Trigger.

Optionally, the receiving module 151 is further configured to receive a CCA message that carries a null non-real-time Trigger sent by the OCS, where the null non-real-time Trigger does not correspond to any event, and the processing module 154 is further configured to invalidate a currently used non-real-time Trigger.

According to the apparatus for information exchange in online charging 15 provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 15:
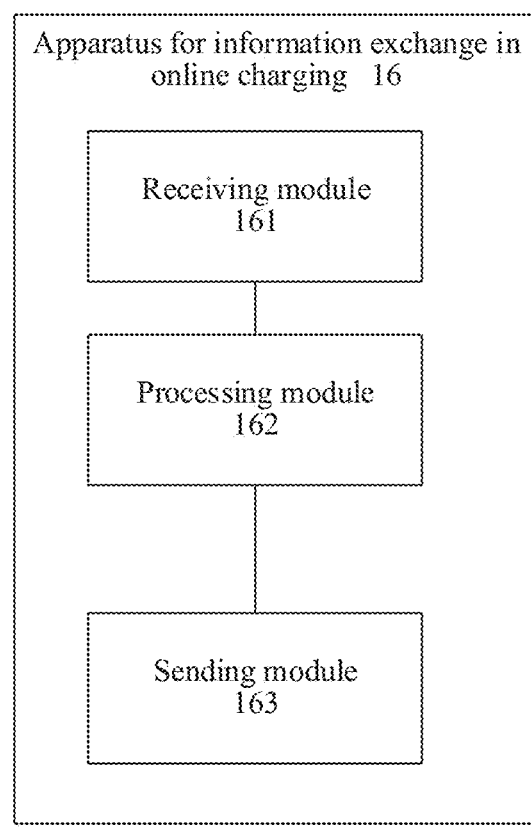
FIG. 15 is a schematic structural diagram of another apparatus for information exchange in online charging according to an embodiment of the present disclosure.

An embodiment of the present disclosure further provides an apparatus for information exchange in online charging 16 and that may be applied to an OCS device. As shown in FIG. 15, the apparatus for information exchange in online charging 16 may include a receiving module 161, a processing module 162, and a sending module 163.

The receiving module 161 is configured to receive a CCR message sent by a CTF device and that carries a quota request.

The processing module 162 is configured to determine a non-real-time Trigger according to the quota request.

The sending module 163 is configured to send a CCA message carrying the non-real-time Trigger to the CTF device, where the non-real-time Trigger corresponds to one or more quotas of a rating group, and where the non-real-time Trigger refers to when a corresponding event happens, the CTF device is triggered to record charging information before and after the event happens, and the CTF device is not triggered to report the recorded charging information to an OCS.

The receiving module 161 is further configured to receive a CCR message sent by the CTF device and that carries charging information, where the CCR message includes charging information before and after the corresponding event of the non-real-time Trigger happens each time.

The CCR message carrying the charging information includes at least two containers, and the charging information before and after the corresponding event of the non-real-time Trigger happens each time is separately placed into different containers.

The charging information includes one or more of quota usage information recorded by the CTF device, the non-real-time Trigger, or information about the corresponding event of the non-real-time Trigger. The non-real-time Trigger includes one or more of a user location changes, an allocated QoS value changes, an accessed wireless network type changes, a serving gateway address changes, a serving gateway type changes, a time zone in which a user is located changes, or a serving network PLMN changes, and the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

In an optional implementation solution, information in the container includes quota usage information of the rating group corresponding to the non-real-time Trigger and/or information about all corresponding events of the non-real-time Trigger before the non-real-time Trigger happens.

In another optional implementation solution, information in the container includes quota usage information of the rating group corresponding to the non-real-time Trigger before the corresponding event of the non-real-time Trigger happens and information corresponding to all non-real-time Triggers sent by the OCS and that have happened in a current reporting period.

In still another optional implementation solution, information in the container includes quota usage information of the rating group corresponding to the non-real-time Trigger before the corresponding event of the non-real-time Trigger happens and information about all corresponding events of the non-real-time Trigger sent by the OCS.

In the foregoing implementation solution, the information in the container is information before the corresponding event of the non-real-time Trigger happens if the container further includes the non-real-time Trigger, or the information in the container is information after the corresponding event of the non-real-time Trigger happens for the last time and before the CTF device sends the CCR message to the OCS if the container does not include any non-real-time Trigger.

Optionally, the containers included in the CCR message separately carry one sequence number, sequence numbers of the containers are arranged in time sequence, and the OCS differentiates the containers in time sequence according to the sequence numbers of the containers.

According to the apparatus for information exchange in online charging provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 16:
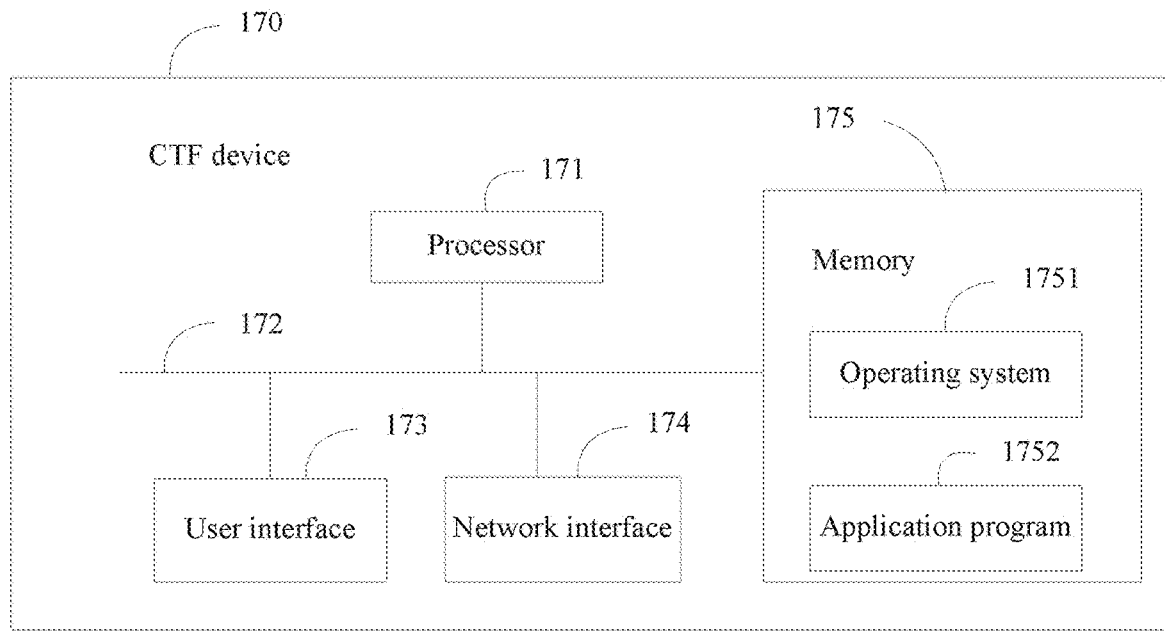
FIG. 16 is a schematic structural diagram of a CTF device according to an embodiment of the present disclosure.

An embodiment of the present disclosure further provides a CTF device 170. As shown in FIG. 16, the CTF device 170 includes at least one processor 171, such as a central processing unit (CPU), at least one network interface 174 or a user interface 173, a memory 175, and at least one communications bus 172. The communications bus 172 is configured to implement connection and communication between these components. Optionally, the CTF device 170 further includes the user interface 173, including a display, a keyboard, or a clicking device (for example, a mouse, a trackball, a touch panel, or a touch display screen). The memory 175 may include a high-speed random-access memory (RAM), and may further include a non-volatile memory, for example, at least one magnetic disk memory. The memory 175 may optionally include at least one storage apparatus far away from the processor 171.

In some implementation manners, the memory 175 stores the following elements, an executable module or a data structure, or a subset thereof, or an extension set thereof, an operating system 1751, including various system programs and configured to implement various basic services and process a hardware-based task, and an application program 1752, including various application programs and configured to implement various application services.

The application program 1752 includes but is not limited to a receiving module (not shown), a storage module (not shown), a sending module (not shown), and a processing module (not shown).

For implementation of the modules in the application program 1752, refer to the corresponding modules in the embodiment shown in FIG. 14, and details are not described herein.

Further, the network interface 174 is configured to receive a CCA message that carries a non-real-time Trigger sent by an OCS, where the CCA message responds to a CCR message that carries a quota request sent by the CTF device 170, where the non-real-time Trigger corresponds to one or more quotas of a rating group, and where the non-real-time Trigger refers to when a corresponding event happens, the CTF device 170 is triggered to record charging information before and after the corresponding event happens, and the CTF device 170 is not triggered to report the recorded charging information to the OCS. The memory 175 is configured to record, before a CCR message is sent to the OCS next time, charging information before and after the corresponding event of the non-real-time Trigger happens each time, and the network interface 174 is further configured to send the CCR message to the OCS, where the CCR message includes the charging information before and after the corresponding event of the non-real-time Trigger happens each time.

Optionally, the memory 175 may be further configured to each time when it is detected that the corresponding event of the non-real-time Trigger happens, store quota usage information of the rating group corresponding to the non-real-time Trigger and/or information about the corresponding event of the non-real-time Trigger before the non-real-time Trigger happens, and restart to record quota usage information and/or information about the corresponding event of the non-real-time Trigger after the non-real-time Trigger happens.

Optionally, before the CTF device 170 sends the CCR message to the OCS, the memory 175 is further configured to separately place the charging information before and after the corresponding event of the non-real-time Trigger happens each time into different containers, where the CCR message includes at least two containers, and the charging information includes one or more of the quota usage information recorded by the CTF device 170, the non-real-time Trigger, or the information about the corresponding event of the non-real-time Trigger. The non-real-time Trigger includes one or more of a user location changes, an allocated QoS value changes, an accessed wireless network type changes, a serving gateway address changes, a serving gateway type changes, a time zone in which a user is located changes, or a serving network PLMN changes, and the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

Optionally, the memory 175 is further configured to place charging information before the simultaneous events happen into a same container when at least two corresponding events of the non-real-time Trigger happen simultaneously.

Optionally, before the CTF device 170 sends the CCR message to the OCS, the processor 171 is configured to determine whether same information exists in the charging information in the different containers, and place, outside the containers, the same information in the charging information in the different containers if the same information exists.

In an optional implementation solution, information in the container may include the quota usage information of the rating group corresponding to the non-real-time Trigger and/or information about all corresponding events of the non-real-time Trigger before the non-real-time Trigger happens.

In another optional implementation solution, information in the container includes the quota usage information of the rating group corresponding to the non-real-time Trigger before the corresponding event of the non-real-time Trigger happens and information about all corresponding events that have happened in a current reporting period and of the non-real-time Trigger sent by the OCS.

In still another optional implementation solution, information in the container includes the quota usage information of the rating group corresponding to the non-real-time Trigger before the corresponding event of the non-real-time Trigger happens and information about all corresponding events of the non-real-time Trigger sent by the OCS.

In the foregoing implementation solution, the container further includes the non-real-time Trigger if the information in the container is information before the corresponding event of the non-real-time Trigger happens, or the container does not include any non-real-time Trigger if the information in the container is information after the corresponding event of the non-real-time Trigger happens for the last time and before the CTF device sends the CCR message to the OCS.

Optionally, the containers included in the CCR message separately carry one sequence number, and sequence numbers of the containers are arranged in time sequence such that the OCS differentiates the containers in time sequence according to the sequence numbers of the containers.

Optionally, the network interface 174 is further configured to send the CCR message to the OCS when the event happens if corresponding events of a real-time Trigger and the non-real-time Trigger carried in the CCA message sent by the OCS are the same.

Optionally, the network interface 174 is further configured to receive again a CCA that carries a new non-real-time Trigger sent by the OCS, where the CTF device 170 has received the non-real-time Trigger sent by the OCS, and the processor 171 is further configured to replace the received non-real-time Trigger with the new non-real-time Trigger.

Optionally, the network interface 174 is further configured to receive a CCA message that carries a null non-real-time Trigger sent by the OCS, where the null non-real-time Trigger does not correspond to any event, and the processor 171 is further configured to invalidate a currently used non-real-time Trigger.

According to the CTF device 170 provided in this embodiment of the present disclosure, the CTF device 170 can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device 170 to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

Figure 17:
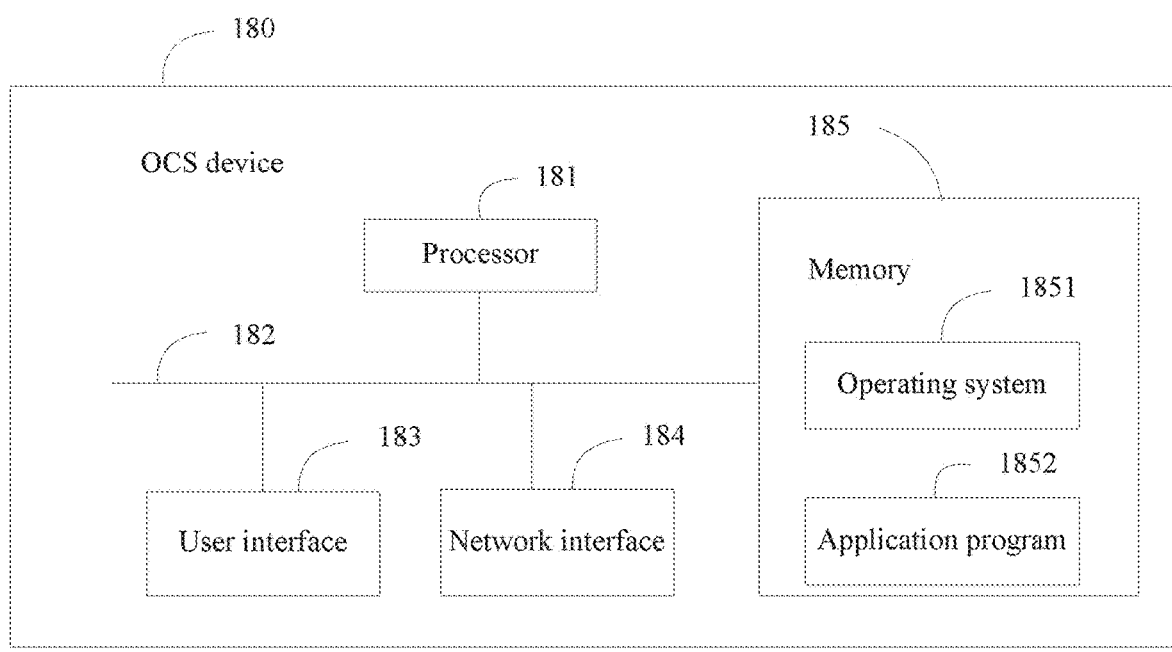
FIG. 17 is a schematic structural diagram of an OCS device according to an embodiment of the present disclosure.

An embodiment of the present disclosure further provides an OCS device 180. As shown in FIG. 17, the OCS device 180 includes at least one processor 181, such as a CPU, at least one network interface 184 or a user interface 183, a memory 185, and at least one communications bus 182. The communications bus 182 is configured to implement connection and communication between these components. Optionally, the OCS device 180 further includes the user interface 183, including a display, a keyboard, or a clicking device (for example, a mouse, a trackball, a touch panel, or a touch display screen). The memory 185 may include a high-speed RAM, and may further include a non-volatile memory, for example, at least one magnetic disk memory. The memory 185 may optionally include at least one storage apparatus far away from the processor 181.

In some implementation manners, the memory 185 stores the following elements, an executable module or a data structure, or a subset thereof, or an extension set thereof, an operating system 1851, including various system programs and configured to implement various basic services and process a hardware-based task, and an application program 1852, including various application programs and configured to implement various application services.

The application program 1852 includes but is not limited to a receiving module (not shown), a processing module (not shown), and a sending module (not shown).

For implementation of the modules in the application program 1852, refer to the corresponding modules in the embodiment shown in FIG. 15, and details are not described herein.

Further, the network interface 184 is configured to receive a CCR message sent by a CTF device and that carries a quota request. The processor 181 is configured to determine a non-real-time Trigger according to the quota request. The network interface 184 is configured to send a CCA message carrying the non-real-time Trigger to the CTF device, where the non-real-time Trigger corresponds to one or more quotas of a rating group, and the non-real-time Trigger refers to when a corresponding event happens, the CTF device is triggered to record charging information before and after the corresponding event happens, and the CTF device is not triggered to report the recorded charging information to an OCS, and the network interface 184 is further configured to receive a CCR message that is sent by the CTF device and that carries charging information, where the CCR message carrying the charging information includes charging information before and after the corresponding event of the non-real-time Trigger happens each time.

The CCR message carrying the charging information includes at least two containers, and the charging information before and after the corresponding event of the non-real-time Trigger happens each time is separately placed into different containers.

The charging information includes one or more of quota usage information recorded by the CTF device, the non-real-time Trigger, or information about the corresponding event of the non-real-time Trigger. The non-real-time Trigger includes one or more of a user location changes, an allocated QoS value changes, an accessed wireless network type changes, a serving gateway address changes, a serving gateway type changes, a time zone in which a user is located changes, or a serving network PLMN changes, and the information about the corresponding event of the non-real-time Trigger includes at least one or more values of the user location, the allocated QoS value, the accessed wireless network type, the serving gateway address, the serving gateway type, the time zone in which the user is located, or the serving network PLMN.

In an optional implementation solution, information in the container includes quota usage information of the rating group corresponding to the non-real-time Trigger and/or information about all corresponding events of the non-real-time Trigger before the non-real-time Trigger happens.

In another optional implementation solution, information in the container includes quota usage information of the rating group corresponding to the non-real-time Trigger before the corresponding event of the non-real-time Trigger happens and information about all corresponding events that have happened in a current reporting period and that are of the non-real-time Trigger sent by the OCS.

In still another optional implementation solution, information in the container includes quota usage information of the rating group corresponding to the non-real-time Trigger before the corresponding event of the non-real-time Trigger happens and information about all corresponding events of the non-real-time Trigger sent by the OCS.

In the foregoing implementation solution, the information in the container is information before the corresponding event of the non-real-time Trigger happens if the container further includes the non-real-time Trigger, or the information in the container is information after the corresponding event of the non-real-time Trigger happens for the last time and before the CTF device sends the CCR message to the OCS if the container does not include any non-real-time Trigger.

Optionally, the containers included in the CCR message separately carry one sequence number, sequence numbers of the containers are arranged in time sequence, and the OCS differentiates the containers in time sequence according to the sequence numbers of the containers.

According to the OCS device 180 provided in this embodiment of the present disclosure, a CTF device can receive a CCA message that carries a non-real-time Trigger sent by an OCS, before sending a CCR message to the OCS next time, record charging information before and after a corresponding event of the non-real-time Trigger happens each time, and send the CCR message carrying the recorded charging information to the OCS such that a CCR message reported each time by the CTF device to the OCS carries the charging information before and after the corresponding event of the non-real-time Trigger happens each time. Compared with a solution in which charging information is reported in real time each time an event happens, in the present disclosure, when a corresponding event of a non-real-time Trigger happens, charging information before and after the event happens can be first recorded, and when the charging information needs to be reported to an OCS, charging information before and after the event happens each time can be carried in a CCR message and then reported to the OCS, thereby preventing a CTF device from frequently reporting the charging information to the OCS, reducing frequency of information exchange between the CTF device and the OCS, and reducing a pressure of information transmission between the CTF device and the OCS.

The embodiments in this specification are all described in a progressive manner. For same or similar parts in the embodiments, reference may be made to these embodiments, and each embodiment focuses on a difference from other embodiments. Especially, a device embodiment is basically similar to a method embodiment, and therefore is described briefly. For related parts, reference may be made to partial descriptions in the method embodiment.

A person of ordinary skill in the art may understand that all or a part of the processes of the methods in the embodiments may be implemented by a computer program instructing relevant hardware. The program may be stored in a computer readable storage medium. The processes of the methods in the embodiments are performed when the program runs. The storage medium may include a magnetic disk, an optical disc, a read-only memory (ROM), a RAM, or the like.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for online charging and comprising:
   receiving, by at least one processor of a charging system and from a charging trigger function device, a first charging request message;
   determining, by the at least one processor and in response to the first charging request message, a non-real-time trigger;
   sending, by the at least one processor and to the charging trigger function device, the non-real-time trigger;
   receiving, by the at least one processor and from the charging trigger function device, a second charging request message comprising first charging information and second charging information, wherein the first charging information is associated with a first chargeable event corresponding to the non-real-time trigger and comprises first quota usage information of a rating group, wherein the second charging information is associated with a second chargeable event corresponding to a real-time trigger and comprises second quota usage information of the rating group, and wherein the second chargeable event is after the first chargeable event; and
   sending, by the at least one processor and to the charging trigger function device, a second charging answer message corresponding to the second charging request message,
   wherein the non-real-time trigger enables the charging trigger function device to store, but not report to the charging system, when a chargeable event corresponding to the non-real-time trigger happens, charging information collected before the chargeable event.

2. The method according to claim 1, wherein the first charging information and the second charging information are in different containers in the second charging request message.

3. The method according to claim 2, wherein each of the different containers in the second charging request message comprises one sequence number, and wherein sequence numbers of the different containers are arranged in a time sequence.

4. The method according to claim 1, wherein the non-real-time trigger comprises one or more of:
   a user location change,
   an allocated quality of service (QOS) value change,
   a serving gateway address change,
   an accessed wireless network type change,
   a serving gateway type change,
   a time zone change, or
   a serving public land mobile network (PLMN) change.

5. The method according to claim 1, wherein the first charging information further comprises one or more of the non-real-time trigger or information about the first chargeable event, and wherein the information about the first chargeable event comprises one or more of:
   a user location,
   an allocated quality of service (QOS) value,
   a serving gateway address,
   an accessed wireless network type,
   a serving gateway type,
   a time zone in which a user is located, or
   a serving public land mobile network (PLMN).

6. The method according to claim 1, further comprising:
   sending, by the at least one processor, a third charging answer message to the charging trigger function device, wherein the third charging answer message comprises a new non-real-time trigger for replacing the non-real-time trigger; or
   sending, by the at least one processor, a fourth charging answer message to the charging trigger function device, wherein the fourth charging answer message comprises a null non-real-time trigger for invalidating the non-real-time trigger.

7. The method according to claim 1, wherein the first second charging answer message indicates receipt of the first charging information and the second charging information.

8. A charging system comprising:
   at least one processor; and
   a memory coupled to the at least one processor and configured to store instructions for execution by the at least one processor to:
   receive, from a charging trigger function device, a first charging request message;
   determine, in response to the first charging request message, a non-real-time trigger;
   send, to the charging trigger function device, the non-real-time trigger;
   receive, from the charging trigger function device, a second charging request message comprising first charging information and second charging information, wherein the first charging information is associated with a first chargeable event corresponding to the non-real-time trigger and comprises first quota usage information of a rating group, wherein the second charging information is associated with a second chargeable event corresponding to a real-time trigger and comprises second quota usage information of the rating group, and wherein the second chargeable event is after the first chargeable event; and
   send, to the charging trigger function device, a first second charging answer message corresponding to the second charging request message,
   wherein the non-real-time trigger enables the charging trigger function device to store, but not report to the charging system, when a chargeable event corresponding to the non-real-time trigger happens, charging information collected before the chargeable event.

9. The charging system according to claim 8, wherein the first charging information and the second charging information are in different containers in the second charging request message.

10. The charging system according to claim 9, wherein each of the different containers in the charging request message comprises one sequence number, and wherein sequence numbers of the different containers are arranged in a time sequence.

11. The charging system according to claim 8, wherein when the instructions are executed, the at least one processor is further caused to:
send a third charging answer message to the charging trigger function device, wherein the third charging answer message comprises a new non-real-time trigger for replacing the non-real-time trigger; or
send a fourth charging answer message to the charging trigger function device, wherein the fourth charging answer message comprises a null non-real-time trigger for invalidating the non-real-time trigger.

12. A communications system comprising:
a charging trigger function device configured to:
detect a first chargeable event corresponding to a non-real-time trigger;
store first charging information collected before the first chargeable event, wherein the first charging information comprises first quota usage information of a rating group;
collect second charging information after the first chargeable event, wherein the second charging information comprises second quota usage information of the rating group; and
send, in response to detecting a second chargeable event corresponding to a real-time trigger, a charging request message, wherein the second chargeable event is after the first chargeable event, and wherein the charging request message comprises the first charging information and the second charging information; and
a charging system configured to:
receive the charging request message from the charging trigger function device; and
send a first charging answer message corresponding to the charging request message to the charging trigger function device,
wherein the non-real-time trigger enables the charging trigger function device to store, but not report to the charging system, when a chargeable event corresponding to the non-real-time trigger happens, charging information collected before the chargeable event.

13. The communications system according to claim 12, wherein the charging trigger function device is further configured to place the first charging information and the second charging information into different containers in the charging request message.

14. The communications system according to claim 13, wherein each of the different containers in the charging request message comprises one sequence number, and wherein sequence numbers of the different containers are arranged in a time sequence.

15. The communications system according to claim 12, wherein the charging system is further configured to send, before receiving the charging request message, a second charging answer message to the charging trigger function device, wherein the second charging answer message comprises the non-real-time trigger, and wherein the charging trigger function device is further configured to receive the second charging answer message.

16. The communications system according to claim 12, wherein the charging system is further configured to:
send a third charging answer message to the charging trigger function device, wherein the third charging answer message comprises a new non-real-time trigger for replacing the non-real-time trigger; or
send a fourth charging answer message to the charging trigger function device, wherein the fourth charging answer message comprises a null non-real-time trigger for invalidating the non-real-time trigger.

17. The communications system according to claim 12, wherein the charging system is further configured to:
receive, from the charging trigger function device, a first charging request message;
determine the non-real-time trigger in response to the first charging request message; and
send the non-real-time trigger to the charging trigger function device.

18. A method comprising:
detecting, by at least one first processor of a charging trigger function device, a first chargeable event corresponding to a non-real-time trigger;
storing, by the at least one first processor, first charging information collected before the first chargeable event, wherein the first charging information comprises first quota usage information of a rating group;
collecting, by the at least one first processor, second charging information after the first chargeable event, wherein the second charging information comprises second quota usage information of the rating group;
sending, by the at least one first processor and in response to detecting a second chargeable event corresponding to a real-time trigger, a charging request message, wherein the second chargeable event is after the first chargeable event, and wherein the charging request message comprises the first charging information and the second charging information;
receiving, by at least one second processor of a charging system, the charging request message from the charging trigger function device; and
sending, by the at least one second processor, a first charging answer message corresponding to the charging request message to the charging trigger function device,
wherein the non-real-time trigger enables the charging trigger function device to store, but not report to the charging system, when a chargeable event corresponding to the non-real-time trigger happens, charging information collected before the chargeable event.

19. The method according to claim 18, further comprising placing, by the at least one first processor, the first charging information and the second charging information into different containers in the charging request message.

20. The method according to claim 19, wherein each of the different containers in the charging request message comprises one sequence number, and wherein sequence numbers of the different containers are arranged in a time sequence.

21. The method according to claim 18, further comprising sending, by the at least one second processor and before receiving the charging request message, a second charging answer message to the charging trigger function device, wherein the second charging answer message comprises the non-real-time trigger, and wherein the charging trigger function device is further configured to receive the second charging answer message.

22. The method according to claim 18, further comprising:
   sending, by the at least one second processor, a third charging answer message to the charging trigger function device, wherein the third charging answer message comprises a new non-real-time trigger for replacing the non-real-time trigger; or
   sending, by the at least one second processor, a fourth charging answer message to the charging trigger function device, wherein the fourth charging answer message comprises a null non-real-time trigger for invalidating the non-real-time trigger.

23. The method according to claim 18, wherein the first charging answer message indicates receipt of the first charging information and the second charging information.

24. The method according to claim 18, further comprising:
   receiving, by the at least one second processor and from the charging trigger function device, a first charging request message;
   determining, by the at least one second processor, the non-real-time trigger in response to the first charging request message; and
   sending, by the at least one second processor, the non-real-time trigger to the charging trigger function device.

25. A computer program product comprising instructions that are stored on a non-transitory computer-readable storage medium and that, when executed by at least one processor, cause an apparatus to:
   receive, from a charging trigger function device, a first charging request message,
   determine, in response to the first charging request message, a non-real-time trigger,
   send, to the charging trigger function device, the non-real-time trigger,
   receive, from the charging trigger function device, a second charging request message comprising first charging information and second charging information, wherein the first charging information is associated with a first chargeable event corresponding to the non-real-time trigger and comprises first quota usage information of a rating group, wherein the second charging information is associated with a second chargeable event corresponding to a real-time trigger and comprises second quota usage information of the rating group, and wherein the second chargeable event is after the first chargeable event, and
   send, to the charging trigger function device, a second charging answer message corresponding to the second charging request message,
   wherein the non-real-time trigger enables the charging trigger function device to store, but not report to a charging system, when a chargeable event corresponding to the non-real-time trigger happens, charging information collected before the chargeable event.

26. A non-transitory computer-readable storage medium storing instructions that, when executed by at least one processor, cause an apparatus to:
   receive, from a charging trigger function device, a first charging request message,
   determine, in response to the first charging request message, a non-real-time trigger,
   send, to the charging trigger function device, the non-real-time trigger,
   receive, from the charging trigger function device, a second charging request message comprising first charging information and second charging information, wherein the first charging information is associated with a first chargeable event corresponding to the non-real-time trigger and comprises first quota usage information of a rating group, wherein the second charging information is associated with a second chargeable event corresponding to a real-time trigger and comprises second quota usage information of the rating group, and wherein the second chargeable event is after the first chargeable event; and
   send, to the charging trigger function device, a second charging answer message corresponding to the second charging request message,
   wherein the non-real-time trigger enables the charging trigger function device to store, but not report to a charging system, when a chargeable event corresponding to the non-real-time trigger happens, charging information collected before the chargeable event.

* * * * *

UNITED STATES PATENT AND TRADEMARK OFFICE
CERTIFICATE OF CORRECTION

| | | |
|---|---|---|
| PATENT NO. | : 12,388,933 B2 | Page 1 of 1 |
| APPLICATION NO. | : 17/887688 | |
| DATED | : August 12, 2025 | |
| INVENTOR(S) | : Xiaoqian Chai | |

It is certified that error appears in the above-identified patent and that said Letters Patent is hereby corrected as shown below:

In the Claims

Claim 7, Column 34, Lines 30-31: "wherein the first second charging" should read "wherein the second charging"

Claim 8, Column 34, Lines 59-60: "a first second charging" should read "a second charging"

Claim 25, Column 37, Line 35: "request message," should read "request message;"

Claim 25, Column 37, Line 37: "trigger," should read "trigger;"

Claim 25, Column 37, Line 39: "trigger," should read "trigger;"

Claim 25, Column 38, Line 6: "event, and" should read "event; and"

Claim 26, Column 38, Line 15: "Anon-transitory" should read "A non-transitory"

Claim 26, Column 38, Line 19: "request message," should read "request message;"

Claim 26, Column 38, Line 21: "trigger," should read "trigger;"

Claim 26, Column 38, Line 23: "trigger," should read "trigger;"

Signed and Sealed this
Seventh Day of October, 2025

John A. Squires
*Director of the United States Patent and Trademark Office*